US012377882B2

(12) United States Patent
Longo et al.

(10) Patent No.: US 12,377,882 B2
(45) Date of Patent: Aug. 5, 2025

(54) RECURSIVE, REAL-TIME CAPABLE, INTERACTION-AWARE METHODS OF PLANNING MOTIONS FOR AUTONOMOUS VEHICLES

(71) Applicant: EMBOTECH AG, Zürich (CH)

(72) Inventors: Stefano Longo, Zürich (CH);
Alexander Domahidi, Maur (CH);
Marcel Menner, Zürich (CH);
Vasileios Lefkopoulos, Zürich (CH);
Melanie Nicole Zeilinger, Maur (CH)

(73) Assignee: EMBOTECH AG, Zürich (CH)

( * ) Notice: Subject to any disclaimer, the term of this patent is extended or adjusted under 35 U.S.C. 154(b) by 238 days.

(21) Appl. No.: 18/014,717

(22) PCT Filed: Jul. 10, 2020

(86) PCT No.: PCT/EP2020/069674
§ 371 (c)(1),
(2) Date: Jan. 5, 2023

(87) PCT Pub. No.: WO2022/008087
PCT Pub. Date: Jan. 13, 2022

(65) Prior Publication Data
US 2023/0347940 A1    Nov. 2, 2023

(51) Int. Cl.
*B60W 60/00*   (2020.01)
*B60W 50/00*   (2006.01)

(52) U.S. Cl.
CPC .. *B60W 60/00272* (2020.02); *B60W 50/0097* (2013.01); *B60W 60/00276* (2020.02); *B60W 2554/4041* (2020.02)

(58) Field of Classification Search
CPC ..... B60W 2554/4041; B60W 50/0097; B60W 60/00276; B60W 60/00272;
(Continued)

(56) References Cited

U.S. PATENT DOCUMENTS

2012/0143488 A1* 6/2012 Othmezouri .......... G06V 20/58
701/301
2018/0374341 A1* 12/2018 Branson ............ B60W 60/0015
(Continued)

FOREIGN PATENT DOCUMENTS

WO    WO-2019136479 A1    7/2019

OTHER PUBLICATIONS

Felix Gruber and Matthias Althoff, Anytime Safety Verification of Autonomous Vehicles, Nov. 4-7, 2018, ITSC, p. 1-7 (Year: 2018).*
(Continued)

*Primary Examiner* — Justin S Lee
(74) *Attorney, Agent, or Firm* — Mannava & Kang, P.C.

(57) ABSTRACT

The invention is notably directed to computer-implemented method of planning motion of a vehicle. The method comprises receiving (S20) real-time signals as to positions of N traffic participants. At each time step of multiple time steps, the method plans (S50) motion for the vehicle by computing (S30) states of each of the N traffic participants according to the signals received (S20). Said states include current states, which are estimated for each of the N traffic participants, as well as future states of each of the participants, wherein the future states are predicted over a prediction horizon T. This is achieved using an interaction-aware model of the N traffic participants. This model is designed to cause the method to recursively compute (S32-S38), at said each time step, the states of each of the N traffic participants according to a hierarchical list. The N traffic participants are ordered in the list from a most determinative one to a least determinative one of the N traffic participants. As a result, the states of the η-th participant in the list are computed based on the states of each of the η−1 participants in the list, $\forall \eta \in [2, \ldots, N]$. This model is further designed to cause the method to update and sort (S40) the hierarchical list based on rules of the road, (Continued)

wherein the rules are evaluated based on the states of each of the N traffic participants as computed at said each time step. The invention is further directed to related computerized systems, vehicles, and computer program products.

18 Claims, 7 Drawing Sheets

(58) Field of Classification Search
CPC ......... B60W 30/0956; B60W 2554/00; B60W 2556/50; B60W 30/09; B60W 60/001; B60W 60/0027; B60W 40/04; B60W 30/18163; B60W 2554/80; B60W 2555/60; G08G 1/166; G08G 1/167
See application file for complete search history.

(56) References Cited

U.S. PATENT DOCUMENTS

2019/0329763 A1    10/2019  Sierra Gonzalez et al.
2020/0379461 A1*   12/2020  Singh .................. G05D 1/0088

OTHER PUBLICATIONS

Brian Paden et al., A Survey of Motion Planning and Control Techniques for Self-driving Urban Vehicles, Apr. 25, 2016, arXiv, pp. 1-27 (Year: 2016).*
H.J. Ferreau et al., "Embedded Optimization Methods for Industrial Automatic Control". IFAC-PapersOnLine, vol. 50, Issue 1, 2017, pp. 13194-13209.
European Patent Office, "International Search Report and Written Opinion for PCT Application No. PCT/EP2020/069674", mailed Mar. 4, 2021, 19 pages.
Cesar Barrios et al., "Multiple Model Framework of Adaptive Extended Kalman Filtering for Predicting Vehicle Location", 2006 IEEE Intelligent Transportation Systems Conference, Sep. 17-20, 2006, pp. 1053-1059.
Miao Zhang et al., "An adaptive road-constrained IMM estimator for ground target tracking in GSM networks", 11th International Conference on Information Fusion, 2008, pp. 1-8.
Robin Schubert et al., "Unifying Bayesian networks and IMM filtering for improved multiple model estimation", 12th International Conference on Information Fusion, 2009. Jul. 6-9, 2009, pp. 810-817.
Toledo-Moreo R. et al., "IMM-Based Lane-Change Prediction in Highways With Low-Cost GPS/INS", IEEE Transactions on Intelligent Transportation Systems, Mar. 2009, vol. 10, No. 1, pp. 180-185.
Helgo Dyckmanns et al., "Object tracking in urban intersections based on active use of a priori knowledge: Active interacting multi model filter", 2011 IEEE Intelligent Vehicles Symposium (IV), Jun. 2011, pp. 625-630.
Ashwin Carvalho et al., "Stochastic predictive control of autonomous vehicles in uncertain environments", AVEC'14 (12th International Symposium on Advanced Vehicle Control); Sep. 22-26, 2014; Tokyo, Japan, Jan. 1, 2014; Sep. 22, 2014-Sep. 26, 2014 Society of Automotive Engineers of Japan, Inc. (JSAE), JP, pp. 712-719.
Beomjun Kim et al., "An IMM/EKF Approach for Enhanced Multitarget State Estimation for Application to Integrated Risk Management System", IEEE Transactions on Vehicular Technology, Mar. 1, 2015, vol. 64, No. 3, pp. 876-889.
Kichun Jo et al., "Tracking and Behavior Reasoning of Moving Vehicles Based on Roadway Geometry Constraints", IEEE Transactions on Intelligent Transportation Systems, Feb. 1, 2017, vol. 18, No. 2, pp. 460-476.
Paolo Bosetti et al., "On the human control of vehicles: an experimental study of acceleration", Sep. 28, 2013, 14 pages.
Nachiket Deo et al., "Multi-Modal Trajectory Prediction of Surrounding Vehicles with Maneuver based LSTMs", 2018 IEEE Intelligent Vehicles Symposium (IV), Jun. 26-30, 2018, pp. 1179-1184.
R.E. Kalman, "A New Approach to Linear Filtering and Prediction Problems", Journal of Basic Engineering, Mar. 1, 1960, 12 pages.
Jaehwan Kim et al., "Collision Risk Assessment Algorithm via Lane-Based Probabilistic Motion Prediction of Surrounding Vehicles", IEEE Transactions on Intelligent Transportation Systems, vol. 19, No. 9, Sep. 2018, pp. 2965-2976.
Stefan Klingelschmitt et al., "Probabilistic Situation Assessment Framework for Multiple, Interacting Traffic Participants in Generic Traffic Scenes", IEEE Intelligent Vehicles Symposium (IV), Sweden Jun. 19-22, 2016, pp. 1141-1148.
E. L. Lawler et al., "Branch-and-Bound Methods: A Survey", Feb. 11, 1966, 22 pages.
Stephanie Lafevre et al., "A survey on motion prediction and risk assessment for intelligent vehicles", ROBOMECH Journal, 2014, 1:1, 14 pages.
E. Mazor et al., "Interacting Multiple Model Methods in Target Tracking: A Survey", IEEE Transactions on Aerospace and Electronic Systems, vol. 34, No. 1, Jan. 1998, pp. 103-123.
Marcel Menner et al., "Convex Formulations and Algebraic Solutions for Linear Quadratic Inverse Optimal Control Problems", 2018 European Conference (ECC), Jun. 12-15, 2018, Limassol, Cyprus, 6 pages.
Brian Paden et al., "A Survey of Motion Planning and Control Techniques for Self-Driving Urban Vehicles", IEEE Transactions on Intelligent Vehicles, vol. 1, No. 1, Mar. 2016, pp. 33-55.
Tom Schouwenaars et al., "Mixed Integer Programming for Multi-Vehicle Path Planning", Proceedings of the European Control Conference 2001, pp. 2603-2608.
Wikipedia, "Sorting algorithm", Jun. 28, 2020, 14 pages. <https://en.wikipedia.org/w/index.php?title=Sorting_algorithm&oldid=964887534>.
Wikipedia, "Bubble sort", May 31, 2020, 6 pages. <https://en.wikipedia.org/w/index.php?title=Bubble_sort&oldid=959950846>.
U.S Dot, "Next Generation Simulation (NDSIM)", Nov. 2, 2020, 1 page.
A. Zanelli et al., "Forces NLP: an efficient implementation of interior-point methods for multistage nonlinear nonconvex programs", International Journal of Control, Year 2020, 18 pages.

* cited by examiner

RECURSIVE, REAL-TIME CAPABLE, INTERACTION-AWARE METHODS OF PLANNING MOTIONS FOR AUTONOMOUS VEHICLES

CLAIM FOR PRIORITY

The present application is a national stage filing under 35 U.S.C 371 of PCT application number PCT/EP2020/069674, having an international filing date of Jul. 10, 2020, the disclosure of which is hereby incorporated by reference in its entirety.

BACKGROUND

The invention relates in general to autonomous or automated vehicles, computer-implemented method of planning motions for such vehicles, as well as related computerized systems and computer program products. In particular, it is directed to methods based on interaction-aware models of the traffic participants.

Motion prediction is a necessary part of any autonomous driving application that employs predictive planning techniques [1]. It can be classified into three categories with an increasing level of abstraction [2]: physics-based, manoeuvre-based, and interaction-aware motion models. Physics-based motion models assume that the vehicle's motion depends only on physical equations of motion. They are the simplest models (e.g., constant velocity, constant acceleration); they work with basic motion primitives and have low computational complexity. As a result, their predictions are typically reliable for a short horizon only. Manoeuvre-based motion models assume that the vehicle's motion can be represented by a series of manoeuvres executed independently of other vehicles. Thus, the predictions obtained are more reliable than predictions of physics-based models. Interaction-aware motion models consider the reactive part of multiple vehicles, thus leading to more accurate and realistic predictions. This, however, comes at the cost of increased computational complexity. As a result, computations incurred by interaction-aware motion models are not always tractable, especially by vehicle-embedded systems.

The following documents form part of the background art:

[1] B. Paden, M. Cáp, S. Z. Yong, D. Yershov, and E. Frazzoli, "A survey of motion planning and control techniques for self-driving urban vehicles," IEEE Trans. Intell. Veh., vol. 1, no. 1, pp. 33-55, 2016.
[2] S. Lefèvre, D. Vasquez, and C. Laugier, "A survey on motion prediction and risk assessment for intelligent vehicles," ROBOMECH J., vol. 1, no. 1, p. 1, 2014.
[3] C. Barrios, H. Himberg, Y. Motai, and A. Sad, "Multiple model framework of adaptive extended Kalman filtering for predicting vehicle location," in IEEE Intell. Transp. Syst. Conf., 2006, pp. 1053-1059.
[4] M. Zhang, S. Knedlik, and 0. Loffeld, "An adaptive road-constrained IMM estimator for ground target tracking in GSM networks," in 11th Int. Conf. Inf. Fusion, 2008, pp. 1-8.
[5] R. Schubert and G. Wanielik, "Unifying bayesian networks and IMM filtering for improved multiple model estimation," in 12th Int. Conf. Inf. Fusion, 2009, pp. 810-817.
[6] R. Toledo-Moreo and M. A. Zamora-Izquierdo, "IMM-based lanechange prediction in highways with low-cost GPS/INS," IEEE Trans. Intell. Transp. Syst., vol. 10, no. 1, pp. 180-185, 2009.
[7] H. Dyckmanns, R. Matthaei, M. Maurer, B. Lichte, J. Effertz, and D. Stüker, "Object tracking in urban intersections based on active use of a priori knowledge: Active interacting multi model filter," in IEEE Intell. Veh. Symp. (I V), 2011, pp. 625-630.
[8] A. Carvalho, Y. Gao, S. Lefevre, and F. Borrelli, "Stochastic predictive control of autonomous vehicles in uncertain environments," in 12th Int. Symp. Adv. Veh. Control, 2014.
[9] B. Kim, K. Yi, H. Yoo, H. Chong, and B. Ko, "An IMM/EKF approach for enhanced multitarget state estimation for application to integrated risk management system," IEEE Trans. Veh. Technol., vol. 64, no. 3, pp. 876-889, 2015.
[10] J. Kim and D. Kum, "Collision risk assessment algorithm via lane-based probabilistic motion prediction of surrounding vehicles," IEEE Trans. Intell. Transp. Syst., vol. 19, no. 9, pp. 2965-2976, 2018.
[11] K. Jo, M. Lee, J. Kim, and M. Sunwoo, "Tracking and behaviour reasoning of moving vehicles based on roadway geometry constraints," IEEE Trans. Intell. Transp. Syst., vol. 18, no. 2, pp. 460-476, 2017.
[12] S. Klingelschmitt, F. Damerow, V. Willert, and J. Eggert, "Probabilistic situation assessment framework for multiple, interacting traffic participants in generic traffic scenes," in IEEE Intell. Veh. Symp. (I V), 2016, pp. 1141-1148.
[13] N. Deo and M. M. Trivedi, "Multi-modal trajectory prediction of surrounding vehicles with manoeuvre based LSTMs," in IEEE Intell. Veh. Symp. (I V), 2018, pp. 1179-1184.
[14] R. E. Kalman, "A new approach to linear filtering and prediction problems," J. Fluids Eng., vol. 82, no. 1, pp. 35-45, 1960.
[15] E. Mazor, A. Averbuch, Y. Bar-Shalom, and J. Dayan, "Interacting multiple model methods in target tracking: a survey," IEEE Trans. Aerosp. Electron. Syst., vol. 34, no. 1, pp. 103-123, 1998.
[16] P. Bosetti, M. D. Lio, and A. Saroldi, "On the human control of vehicles: an experimental study of acceleration," Eur. Transp. Research Rev., vol. 6, no. 2, pp. 157-170, 2013.
[17] M. Menner and M. N. Zeilinger, "Convex formulations and algebraic solutions for linear quadratic inverse optimal control problems," in Eur. Control Conf., 2018, pp. 2107-2112.
[18] T. Schouwenaars, B. D. Moor, E. Feron, and J. P. How, "Mixed integer programming for multi-vehicle path planning," in Eur. Control Conf., 2001, pp. 2603-2608.
[19] E. L. Lawler and D. E. Wood, "Branch-and-bound methods: A survey," Operations Res., vol. 14, no. 4, pp. 699-719, 1966.
[20] Sorting algorithms, see, e.g., https://en.wikipedia.org/wiki/Sorting algorithm and, in particular, https://en.wikipedia.org/wiki/Bubble sort.
[21] U. S. Department of Transportation. (2006 December) Next Generation Simulation (NGSIM). Accessed: Nov. 5, 2019. [Online]. Available: https://ops.fhwa.dot.gov/trafficanalysistools/ngsim.htm
[22] A. Zanelli, A. Domahidi, J. Jerez, and M. Morari, "FORCES NLP: an efficient implementation of interior-point methods for multistage nonlinear nonconvex programs," Int. J. Control, pp. 1-17, 2017.
[23] H. J. Ferreau, S. Almer, R. Verschueren, M. Diehl, D. Frick, A. Domahidi, J. L. Jerez, G. Stathopoulos, C. Jones, "Embedded Optimization Methods for Industrial Automatic Control". IFAC-PapersOnLine, Volume 50, Issue 1

2017, Pages 13194-13209, ISSN 2405-8963, https://doi.org/10.1016/j.ifacol.2017.08.1946.

SUMMARY

According to a first aspect, the present invention is embodied as a computer-implemented method of planning motion of a vehicle. The method comprises receiving real-time signals as to positions of N traffic participants. At each time step of multiple time steps, the method plans motion for the vehicle by computing states of each of the N traffic participants according to the signals received. Said states include current states, which are estimated for each of the N traffic participants, as well as future states of each of the participants, wherein the future states are predicted over a prediction horizon T. This is achieved using an interaction-aware model of the N traffic participants. In detail, this model is designed to cause the method to recursively compute, at said each time step, the states of each of the N traffic participants according to a hierarchical list. The N traffic participants are ordered in the list from a most determinative one to a least determinative one of the N traffic participants. As a result, the states of the $\eta$-th participant in the list are computed based on the states of each of the $\eta-1$ participants in the list, $\forall \eta \in [2, \ldots, N]$. This model is further designed to cause the method to update and sort the hierarchical list based on rules of the road, wherein the latter are evaluated based on the states of each of the N traffic participants as computed at said each time step. Thus, the hierarchical list is updated and sorted at said each time step.

In other words, the problem of estimations and predictions of the states of the traffic participants is decomposed into N computation problems. Such a decomposition is achieved by ordering the traffic participants according to a hierarchical list, which establishes computational priorities. The list allows a recursive computation of states of each participant, one after the other. Therefore, the problem comes down to the computation of N single participants, wherein the $\eta$-th participant interacts with $\eta-1$ participants only, which drastically reduces the computational complexity. The recursive nature of the method and the relatively simple calculations that remain to be performed (once the participants are appropriately ordered in the list) make the method real-time capable on standard vehicle systems, notwithstanding the fact that the model is an interaction-aware model. Although interactions are simplified, the model allows most sensible participant interactions to be accounted for in the hierarchical list, as the latter is sorted based on rules of the road, which rules are evaluated based on the states of each of the N traffic participants as computed at said each time step.

In embodiments, the sorting algorithm is designed to enforce each of the following rules upon sorting the hierarchical list: (i) for any two participants of the N traffic participants that are on a same lane, a leading one of the two participants is the most determinative of the two participants and thus has a lower rank in the list; and (ii) for any two participants of the N traffic participants that are on different lanes, the participant of said two participants that has a largest potential longitudinal progress over the prediction horizon T is the most determinative of the two and thus has a lower rank in the list. Note, such rules are evaluated based on the states of each of the N traffic participants as computed at said each time step. Advantageously, the above rules, in combination, make sure that it is always possible to derive a sorted list of the traffic participants in typical driving scenarios.

Preferably, each participant of said N traffic participants is associated with a finite set of manoeuvre models, and the model is further designed to cause the method to compute the states of each of the N traffic participants by: estimating probabilities of said respective manoeuvre models to be, each, currently in effect for said each participant; and identifying among said respective manoeuvre models a most probable model based on the estimated probabilities, whereby states of said each participant are computed according to the most probable model identified.

In preferred embodiments, the states of each of the N traffic participants are computed using an interacting multiple model Kalman filter, whereby, for said each participant, separate filters of the Kalman filter are used for respective manoeuvre models associated with said each participant and estimates of the separate filters are obtained to estimate the probabilities of the respective manoeuvre models to be currently in effect. Advantageously, the estimates of the separate filters can be obtained in parallel for all of the respective manoeuvre models.

In embodiments, the states of the $\eta$-th participant are predicted according to a projection algorithm enforcing an intent of the $\eta$-th participant not to collide with any other ones of the traffic participants by correspondingly altering states predicted for the $\eta$-th participant at every time step.

Preferably, said projection algorithm is executed according to a mixed-integer quadratic programming implementation thereof.

Said finite set of manoeuvre models may notably be based on two longitudinal motion models, respectively corresponding to a velocity tracking model and a distance keeping model. The finite set of manoeuvre models may also be based on three lateral motion models, respectively corresponding to intention of said each participant to: stay on a same lane; change from a current lane to a left lane; and change from the current lane to a right lane. In preferred embodiments, though, said finite set of manoeuvre models include or consist of six joint motion models combining each of the three lateral motion models with each of the two longitudinal motion models.

In preferred embodiments, the method further comprises actuating the vehicle in the physical world, according to the motion planned.

In embodiments, said prediction horizon T is, on average, between 1 s and 8.0 s. An average duration of said each time step is preferably between 7.5 ms and 60 ms.

According to another aspect, the invention is embodied as a computerized system for planning motion of a vehicle. The system comprises: processing means; a memory; and storage means storing computerized methods. The system is configured to load the computerized methods in the memory, so as to cause the system to access real-time signals as to positions of N traffic participants. This further causes the processing means to plan, at each time step of multiple time steps, motion for the vehicle by computing states of the N traffic participants over a prediction horizon T according to the signals accessed, in operation. Consistently with the previous aspect, this is achieved using an interaction-aware model of the N traffic participants. The model is designed so as to cause the processing means to recursively compute, at said each time step, the states of each of the N traffic participants according to a hierarchical list, wherein the N traffic participants are ordered from a most determinative one to a least determinative one of the N traffic participants, so as for the states of the $\eta$-th participant in the list to be computed based on the states of each of the $\eta-1$ participants in the list, $\forall \eta \in [2, \ldots, N]$. The model further causes the processing means to update and sort the hierarchical list based on rules of the road, wherein the rules are evaluated based on the states of each of the N traffic participants as computed at said each time step.

According to a further aspect, the invention is embodied as a vehicle, comprising: one or more sensors, each configured to detect events or changes in an environment of the vehicle and accordingly produce sensor signals; a receiving unit connected to the one or more sensors and configured to receive said sensor signals from the sensors, in operation; and a computerized system according to the previous aspect. The system is connected to the receiving unit, so as to be able to receive signals therefrom, in operation. In addition, said computerized methods further cause the processing means of the system to produce said real-time signals as to the positions of the N traffic participants, based on the signals received from the receiving unit. Furthermore, the computerized system is configured in the vehicle so as to instruct to actuate the latter (in the real world) in a partly or fully autonomous or automated manner, according to motion planned therefor.

According to a final aspect, the invention is embodied as a computer program product for planning motion of a vehicle. The computer program product comprises a computer readable storage medium having program instructions embodied therewith. The program instructions are executable by a plurality of processing means to cause the latter to take all the steps of a method according to embodiments described above.

Computerized systems, vehicles, methods, and computer program products embodying the present invention will now be described, by way of non-limiting examples, and in reference to the accompanying drawings.

BRIEF DESCRIPTION OF SEVERAL VIEWS OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which:

FIG. 2C) for a given lane change scenario, wherein the predicted trajectories are compared to actual (true) trajectories;

The accompanying drawings show simplified representations of devices or parts thereof, as involved in embodiments. Similar or functionally similar elements in the figures have been allocated the same numeral references, unless otherwise indicated.

DETAILED DESCRIPTION OF EMBODIMENTS OF THE INVENTION

Figure 1A:
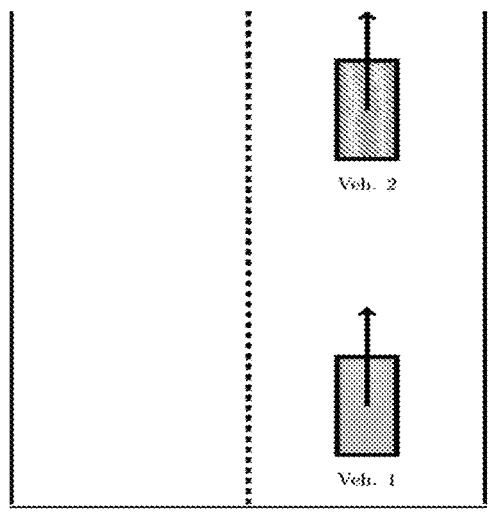
FIGS. 1A-1C schematically depict typical lane scenarios (top views) and aim at illustrating rules used to sort a hierarchical list of vehicles for recursive computations, as involved in embodiments.

The following description is structured as follows. First, general embodiments and high-level variants are described in Section 1. Section 2 describes specific algorithms in detail, as involved in particularly preferred embodiments. Section 3 addresses technical implementation details. Note, the present method and its variants are collectively referred to as the "present methods". All references Sij refer to methods steps of the flowchart of FIG. 7, while numeral references pertain to physical parts or components of the systems of FIGS. 5 and 6.

1. General Embodiments and High-Level Variants

In reference to FIG. 7, a first aspect of the invention is described, which concerns a computer-implemented method of planning motion of a vehicle, as also referred to as the "ego-vehicle" in the following.

As a preliminary remark, the method involves a series of steps S20-S50 that are repeatedly performed over time, for planning the motion of a vehicle. Each of the steps S30 to S50 is preferably performed at each iteration, i.e., at each time step of multiple, successive time steps, as assumed in FIG. 7. The reference time step is defined by step S30, which is typically the most expensive, computationally speaking. Still, the duration of each time step may vary over time, this depending on actual traffic conditions.

A minima, the present methods require real-time positions (absolute or relative) of the traffic participants. At step S20, real-time signals are received, which relate to positions of N traffic participants. If necessary, such signals may further carry information as to additional physical quantities (e.g., velocities and accelerations of the participants), which may possibly be used to increase performance of the present methods. In variants, such quantities may be computed from the sole participant positions, if necessary.

At each time step, the method plans motion S50 for the vehicle by computing S30 states of the N traffic participants. Such states notably include current states, which are estimated S30 for each of the participants. They further include future states of each of the participants, where the future states are states that are predicted S30 over a prediction horizon T. The concept of "state" of a traffic participant is known per se. A state is typically captured as a data structure representing an η-dimensional manifold (i.e., an array of values, or vector). The states of the participants are computed S30 according to the signals received at step S20, using an interaction-aware model (i.e., an algorithm) of the N traffic participants.

Remarkably, the states of each of the N traffic participants are computed S30, at said each time step, according to a hierarchical list of the participant, which establishes computational priorities. That is, owing to its construction, the list allows the states of the participants to be recursively computed S32-S38, i.e., one participant at a time.

In detail, the N traffic participants are ordered in the list from a most determinative participant to a least determinative participant. Note, this list is in fact a sequence, in which no repetition is allowed (as participants are not ubiquitous) but the order of the participants does matter. The most determinative participant has a higher priority in the recursive computations; it has the lowest rank in the list. I.e., the first participant in the list determines sensible actions of all the remaining participants, according to the sorting. Conversely, the least determinative participant, e.g., the last one in the list, is the participant whose sensible actions are determined by all the other participants (e.g., having lower ranks in the list). As a result, the states of the $\eta$-th participant in the list are computed S30 (i.e., estimated and predicted) based on states of each of the $\eta-1$ in the list, that is, based on the states of all participants 1 to $\eta-1$ as ordered in the list, $\forall \eta \in [2, \ldots, N]$.

The $\eta-1$ participants in the list can be regarded as having a higher hierarchical level than the $\eta$-th participant; the $\eta-1$ participants determine states of the $\eta$-th participant, and then the set formed by the $\eta$-th first participants (as ranked in the list) determine states of the $\eta+1$th participants, and so on. In other words, participant #1 in the list can be regarded as a root participant of a tree capturing the hierarchical list, also referred to as a priority list in this document. The states' estimations and predictions must accordingly be computed in the hierarchical order of the list.

In the above definition, n is an indexing variable, which ranges from 2 to N, given that computations related to the very first participant in the list do, in a current iteration, not depend on any prior computation. However, states of participant #1 need be computed too, to allow computations of states of participant #2.

Next, the model is further designed to cause the method to update and sort S40 the hierarchical list. This is step is performed according to rules of the road. Such rules reflect a customary practice of the drivers, as exemplified later. In the present case, such rules are formulated as executable instructions, the execution of which allows the rules to be evaluated based on the latest estimated states, i.e., the states of each of the N traffic participants as computed at S30, which correspond to the latest estimations of the current states and the predicted states of the participants.

In other words, the recursive algorithm can be broken down into two recursive steps S30 and S40 (see also Algorithm 2 in Section 2.1). In the first step S30, for each participants in descending priority order (of ascending rank in the list), single participant estimations and predictions are carried out (e.g., according to steps S32-S38 in FIG. 7, see also Algorithm 1 in Section 2.1). After that, the list is sorted according to new information obtained at the end of a current time step, i.e., the current computational iteration. The updated list will be used in the next iteration. As step S30 is typically the most expensive step, computationally speaking, the hierarchical list can safely be updated and sorted at each iteration, at little additional cost, and as assumed in FIG. 7.

Note, the position signals received at step S20 concern extrinsic participants (i.e., excluding the ego-vehicle). In that respect, computations performed at steps S30 and S40 preferably exclude the ego-vehicle, to achieve more tractable computations. But, eventually, motion of the ego-vehicle is planned S50 according to a world description of all participants, including the ego-vehicle.

Further comments are in order. To start with, the participant states must be both estimated and predicted, as noted above. At each iteration, estimations of the participant states are needed to make predictions, which get later refined by estimating new states, and so on. So, estimations refer to current states of the participants, while predictions refer to future states Although the above definition of the hierarchical list makes it implicit that $N \geq 2$, the algorithm is actually devised so as to take into account any number of potential traffic participants. This number will vary over time as the traffic conditions evolve. Depending on the traffic conditions, the actual number of traffic participants may be, e.g., 0, 1, 2, 3, etc. However, computational advantages of the above algorithm with respect to previous, interaction-aware algorithms, will be perceived as soon as the total number N of participants taken into account equals or exceeds 2, owing to the recursive scheme involved, as discussed below in detail.

The number of participants effectively taken into account by the algorithm may possibly be restricted to a maximum number $N_{max}$ of traffic participants (e.g., the participants that are the closest to the ego-vehicle), where $N_{max}$ is preferably equal to 10. Such an upper bound allows time steps of approximately 0.1 s or less to be achieved in practice, when using typical computer hardware for autonomous vehicles.

Note, the terminology "real-time" used in respect of the signals received at step S20 refers to requirements in terms of necessary throughputs for ensuring a safe autonomous or automated motion of the vehicle. The global, interaction-aware model is updated in real-time, i.e., at each time step. The global algorithm need thus be devise so as to allow sufficiently short time steps, and thereby match requirements of the intended application. In the present case, the global algorithm can typically be devised so as to allow time step durations of about 0.1 s, or less, as noted above.

To this aim, the prediction horizon T will typically be set between 1 s and 8.0 s, though it typically is of approximately 4 s in practice. The prediction horizon may also be dynamically adjusted to account for a current computational load, as in embodiments. The prediction horizon T impacts the average duration of each computational iteration. When using algorithms as described in Section 2.1, each time step duration is, roughly, inversely proportional to the prediction horizon T. In addition, the time step duration further depends on the actual number N of participants. The time step duration (0.1 s) indicated above actually corresponds to maximal durations observed, on average, in scenarios involving up to 10 participants, for a prediction horizon of 4 s. Depending on the actual road circumstances, however, the average time step duration may typically be between 7.5 ms and 60 ms.

The signals are continuously received S20. Such signals may possibly be digital signals (e.g., received as timeseries) or analogue signals (e.g., received continuously, possibly uninterruptedly) that are then converted into digital signals, for processing purposes. The method iterates over computational cycles, and steps S30-S50 are repeatedly performed for the purpose of planning S50 motion of the vehicle. So, at each iteration of steps S30-S50, current positions of the traffic participants are known. The frequency at which signals are received S20 must be compatible with the time steps of the method. The frequency at which such signals are received shall preferably be larger than or equal to the frequency of the computation cycles defined by each time step. In all cases, states of the traffic participants can be computed based on the latest available positions.

Figure 7:
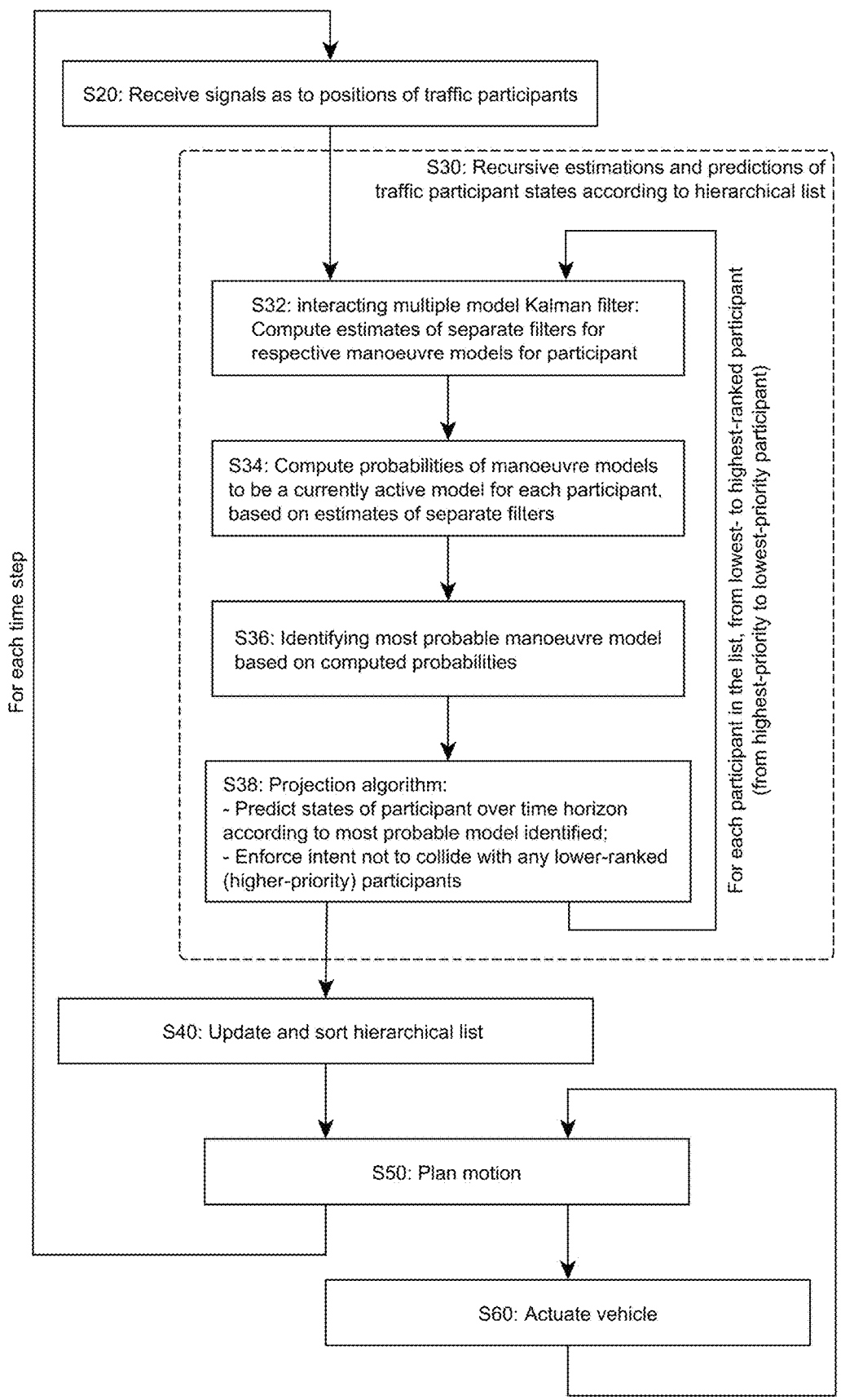
FIG. 7 is a flowchart illustrating high-level steps of a method of planning motion for a vehicle, according to preferred embodiments.

As noted earlier, each of the steps S20-S50 is preferably performed at each iteration, as assumed in FIG. 7. However, the flow indicated in FIG. 7 is merely provided for illustration purposes. Variants may be contemplated, which depart from this flow. In particular, steps S20-S50 may possibly be partly decorrelated, temporally speaking. For example, the frequency at which signals are received may possibly be higher than the iteration frequency (which typically varies too), as noted earlier.

The problem of estimations and predictions of the states of the traffic participants is here construed as a tracking problem. Now, this problem, which is a real-time, N-body problem, is computationally intractable when fully taking into account all interactions between all traffic participants. However, as the present inventors have realized, this problem may advantageously be decomposed into N computation problems. The decomposition is achieved by ordering the traffic participants according to the hierarchical list described above, i.e., ranging from the most determinative participant to the least determinative participant. In turn, this list allows a recursive computation, whereby the problem comes down to the computation of N single participants, wherein the η-th participant interacts with η−1 participants only, which drastically reduces the computational complexity, making the method real-time capable.

Still, the model is not fully separable, given hierarchical dependencies between the participants in the computations performed according to the list. So, the recursive nature of the algorithm prevents parallelization for the several participants. However, computation performed for each participant can be parallelized, as discussed later in detail.

All in all, the proposed approach allows favourable computational performance because of (i) the recursive nature of the method and (ii) the relatively simple calculations that remain to be performed, once the vehicles are appropriately ordered. Compared with other interaction-aware methods (which are usually more complex), one may expect the computational advantage of the present methods to increase with the number N of participants.

The priority scheme underlying the hierarchical list necessarily entails some approximations, compared to a fully-interacting model. Still, recipes can be formulated (in order to be able to sort the participants), which allow most sensible interactions between participants to be retained.

The planning may notably be performed S50 in view of achieving automated or autonomous motion of the vehicle, allowing for various possible levels of intervention of a human. In that respect, the method may further comprise actuating S60 the ego-vehicle (in the physical world), according to the motion planned S50 therefor. In that case, all computations are preferably performed online, i.e., in real time, by the computerized system 202 of the ego vehicle, without it being needed to connect to another system, e.g., a remote server. The present methods may thus be performed locally and independently by the system 202 implementing the method to operate the vehicle. In variants, steps S20-S50 may also be performed for simulation purposes (using a general-purpose or special-purpose computer 200), in which cases the received signals pertain to positions of simulated traffic participants. Thus, the present methods may be implemented by an autonomous driving predictive control system, either in simulation or in a real vehicle, as discussed later in reference to another aspect of the invention.

Finally, although the above steps focus on motion planned based on N traffic participants, practical implementations may further take into account other signals reflecting the environment of the ego-vehicle, starting with detected obstacles, boundaries, etc. Such signals may trigger routines that may possibly take precedence over the interaction-aware algorithm discussed above, for obvious security reasons. Such routines are known per se. How to orchestrate such routines is also known.

At present, particular embodiments of the invention are discussed in detail. To start with, examples of rules are now described, which may be used by the sorting algorithm S40. As said, vehicles are sorted in the list according to the rules of the road. Interestingly, the sorting algorithm may be devised so as to always be able to achieve a sorted list. For example, the sorting algorithm is advantageously designed to enforce each of the following rules, upon sorting S40 the hierarchical list. Such rules are evaluated S40 based on the latest states (including the current and predicted states), as estimated for each of the N traffic participants during step S30:

(1) For any two participants that are on a same lane, the leading participant is the most determinative of the two. Therefore, the leading participant must have a lower rank in the list; and (2) For any two participants on different lanes, the participant having the largest potential longitudinal progress over the prediction horizon T is the most determinative of the two; thus, it must have a lower rank in the list.

A lower rank (or index) in the list means a higher priority, according to terminologies introduced earlier. Note, however, that the list may be equivalently formulated in the opposite order, provided that the computational priorities are respected. The "potential longitudinal progress" of a participant essentially corresponds to the predicted longitudinal progress, which is preferably estimated based on both the current states of the participants and their predicted, future positions (which requires knowledge of the predicted states), as outputted at step S30. On the contrary, the first rule can typically be evaluated based on the sole current states of the participants, as computed at step S30.

Advantageously, the above rules (1) and (2), when enforced in combination, make sure that it is always possible to derive a sorted list of the traffic participants. Still, depending on the actual road context, it may be sufficient to enforce one (only) of the above rules. Yet, as the skilled person may realize, additional or different rules may similarly be devised, which will always result a complete, ordered list. In general, such rules will be devised so as for so as for any trailing vehicle to avoid collisions with a leading vehicle, in accordance with the rules of the road.

Consider FIG. 1A: there two vehicles ("veh. 1" and "veh. 2") are on the same lane. In that case, rule (1) is in effect: the leading vehicle ("veh. 2") is the most determinative (it has higher priority) and will therefore have a lower rank in the list.

Figure 1B:
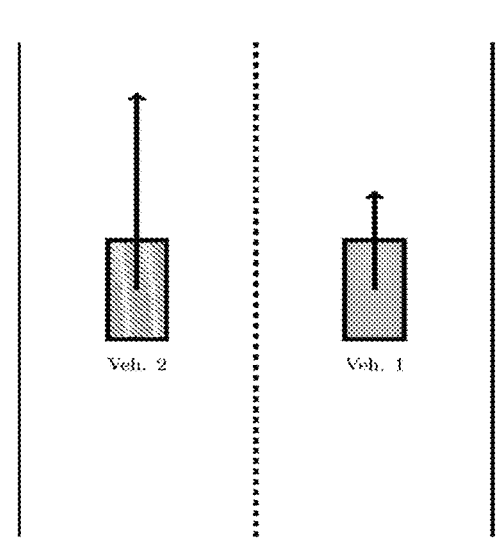

In FIG. 1B, where the two vehicles are on different lanes, this is the second rule that is in effect. Because, in this example, the vehicle on the left lane ("veh. 2") has double the speed than the vehicle on the right lane ("veh. 1"), as the lengths of the arrows suggest, and has a largest potential longitudinal progress over a given prediction horizon in the depicted context. Vehicle 2 is accordingly the most determinative vehicle. It has a higher priority and must have a lower rank in the list.

Figure 1C:
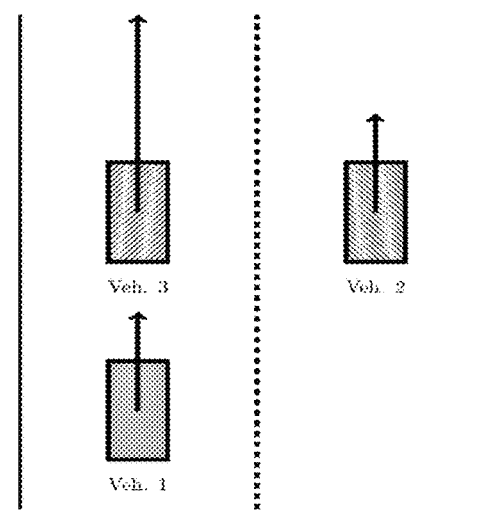

In FIG. 1C, three vehicles are on two lanes, whereby both rule (1) and (2) apply. On the left lane, vehicle 3 ("veh. 3") has higher priority than vehicle 1 ("veh. 1") by virtue of rule (1) because it is the leading vehicle. In addition, vehicle 3 has higher priority than vehicle 2 ("veh. 2"), by virtue of rule (2) because it has a higher speed (on different lanes) and thus have a largest potential longitudinal progress in the depicted context. For completeness, vehicle 2 has a higher priority than vehicle 1 (they have a same velocity) because it is farther ahead in the road and thus has a larger potential longitudinal progress The computation step S30 (pertaining to a single, ranked participant) is now explained in detail, referring back to FIG. 7. Each participant is assumed to be associated with a finite set of manoeuvre models. I.e., each participant is assumed to behave according to one of a limited number of possible behavioural models. The problem is now to determine which of these manoeuvre model is effectively in effect. To that aim, one may adopt a probabilistic approach. Namely, the interaction-aware model may be devised so as to cause the method to estimate S34, for each participant, probabilities for each of the respectively associated manoeuvre models to be currently in effect. Next, the method may identify S36 the most probable model based on the estimated probabilities. Eventually, the states of said each participant are estimated and predicted S38 according to the most probable model identified.

The problem of estimations and predictions of the states of all of the traffic participants is preferably construed as a Bayesian tracking problem of a probability density function, as explained in detail in Section 2.1. For instance, step S30 preferably involves an interacting multiple model Kalman filter, as also described in detail in Section 2.1. Essentially, the interacting multiple model Kalman filter allows separate filters to be used S32 for the manoeuvre models associated with a participant and, this, for each participant. In turn, estimates of the separate filters can be obtained S32 to estimate S34 the probabilities of the respective manoeuvre models to be currently in effect. Advantageously, the computation of such estimates can be performed S32 in parallel for all of the respective manoeuvre models. The most probable model can thus be selected as being the currently active model, for each participant. This model is then used to compute S38 the states of this participant. The same is performed for each participant in the list.

Next, the model may advantageously assume collision-free intents of the multiple traffic participants. Such intents can be enforced by a projection algorithm. That is, for each participant n (i.e., as listed in the list by descending order of priority and consecutively considered for performing step S30), the projection algorithm may enforce an intent of this participant n not to collide with any other participant of the $\eta-1$ participants that have a lower rank (higher priority) in the list. So, by construction, the projection algorithm involve interactions between the $\eta$-th participant and $\eta-1$ participants only. This intent not to collide is enforced by correspondingly altering S38 states that would otherwise be predicted for this participant n (call them collision-agnostic states) and, this, at every time step. The alteration of the collision-agnostic states results from the projection mechanism, which projects agnostic states onto allowed, non-colliding states. The above procedure is applied to each participant $\eta \in [2, \ldots, N]$. A detailed example of projection algorithm is discussed in Section 2.1.

An advantage of this projection algorithm is that it allows a mixed-integer quadratic programming (MIQP) formulation, which, in turn, allows faster computations. This is all the more advantageous that the execution S38 of the projection algorithm is typically the most expensive operation of step S30. Note, the MIQP implementation and, more generally, step S30 may advantageously be run using FORCES PRO [22, 23], leading to even more favourable computational times. The MIQP solve is parallelizable, allowing for even greater computational efficiency, as natively supported by FORCES PRO.

The manoeuvre models are now discussed in more detail. In embodiments, the finite set of manoeuvre models are based on two longitudinal motion models. The latter respectively correspond to a velocity tracking model and a distance keeping model. In variants, or preferably in complement, to such embodiments, the finite set of manoeuvre models may be based on three lateral motion models. The lateral motion model will reflect intentions of the participant to: (i) stay on a same lane; (ii) change from a current lane to a left lane; and (iii) change from the current lane to a right lane. In general, the total number of lateral models is taken to be equal to the number of lanes of the road.

However, in the present context, the interaction-aware model can be designed so as to take into account only one lane change manoeuvre at a time, effectively leading to three possible scenarios, hence the proposed lateral motion models, which allows a reduced computational complexity.

Combining each of the three lateral motion models with each of the two longitudinal motion models gives rise to six joint motion models. Thus, a fairly complete description of the possible manoeuvre models can be based on the six resulting models. In embodiments as described in Section 2.1, the finite set of manoeuvre models consist of the six joint motion models.

Figures 2A, 2B, 2C:
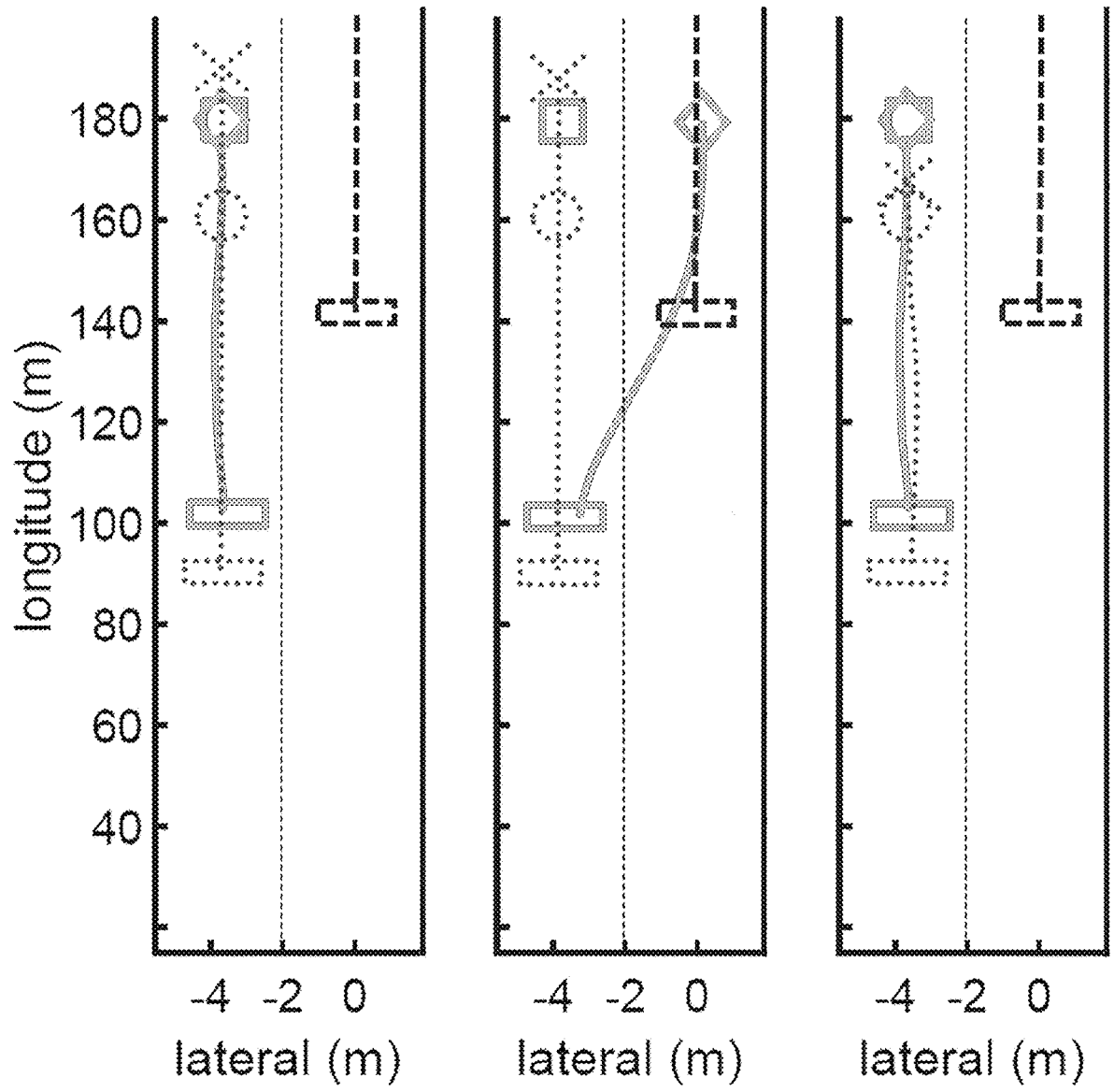
FIGS. 2A-2C are snapshots (top views) illustrating predictions of trajectories of vehicles as obtained with various models (including a model according to embodiments.

For example, FIGS. 2A-2C illustrate predictions of trajectories of vehicles for a given lane change scenario, wherein the predictions are compared to actual (true) trajectories. Various models are used for the predictions. The predicted results obtained in FIG. 2A are based on CV-CA models, whereas FIG. 2C relies on VT-DK models (wherein the updating/sorting of the hierarchical list is disabled, contrary to step S40 in FIG. 7), and FIG. 2C uses the full flow of FIG. 7.

Distinct patterns (dotted, thick grey, and dashed lines) are used for the three vehicles involved. For each vehicle, the predicted trajectory is displayed using the same pattern as the vehicle outlined. The circles represent actual (real) end points of the dotted vehicle's trajectory, whereas the crosses represent the predicted end points of the dotted vehicle's trajectory: a better agreement is seen in FIG. 2C. The squares represent actual (true) end points of the thick-grey vehicle's trajectory, whereas diamonds represent the predicted end points of the thick-grey vehicle's trajectory. Concerning the thick-grey vehicle, the predicted trajectories shown in FIGS. 2A and 2C are more accurate than the predicted trajectory of FIG. 2B. However, the model used in FIG. 2C preserve the relative position observed for the endpoints of the vehicles on the left lane, unlike the model used in FIG. 2A. Thus, FIGS. 2A-2B illustrate the impact of both the updated list and the VT-DK models.

Figure 5:
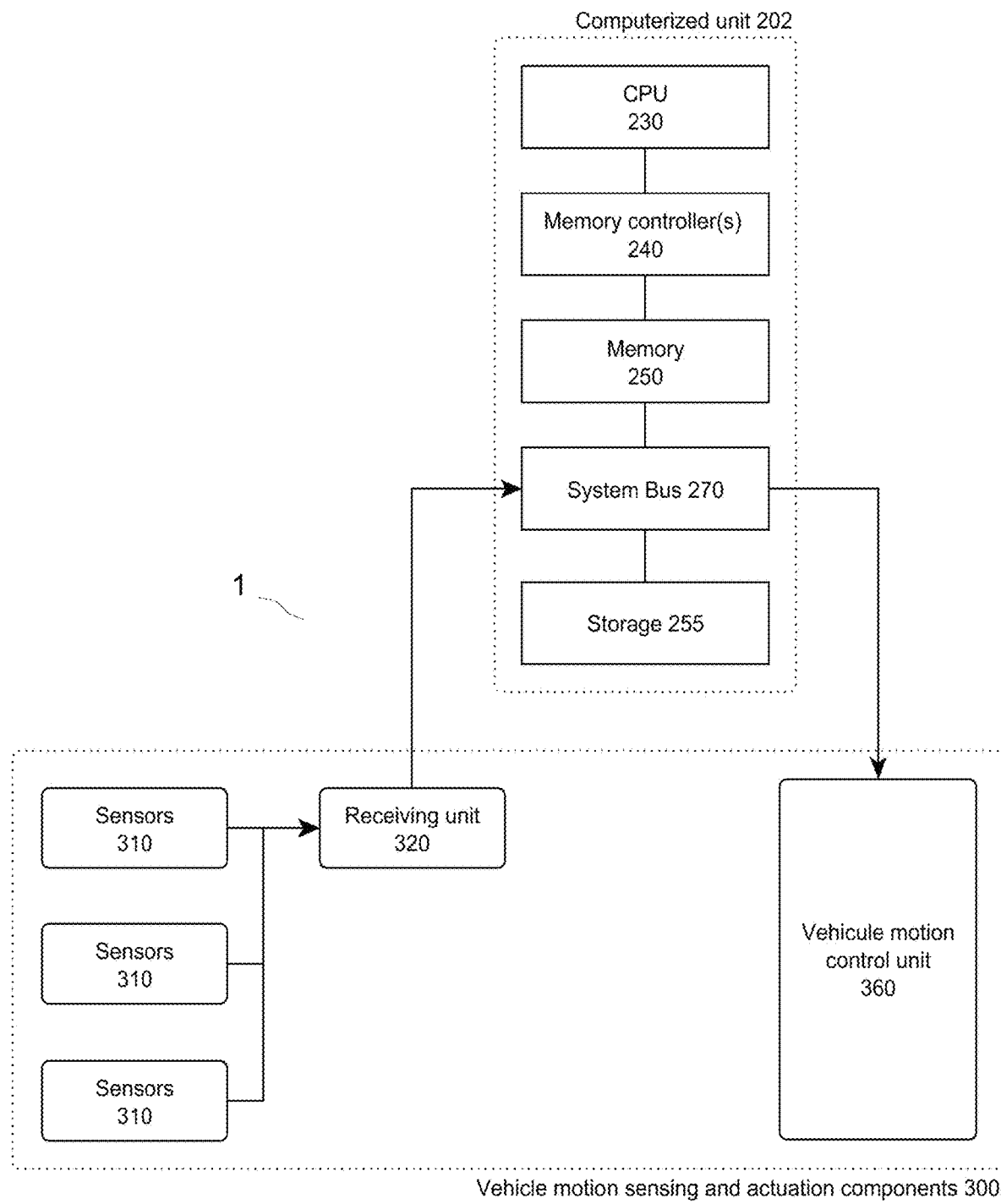
FIG. 5 is a functional diagram of a vehicle that includes a special-purpose computerized system, suited for implementing method steps as in embodiments of the invention.
Figure 6:
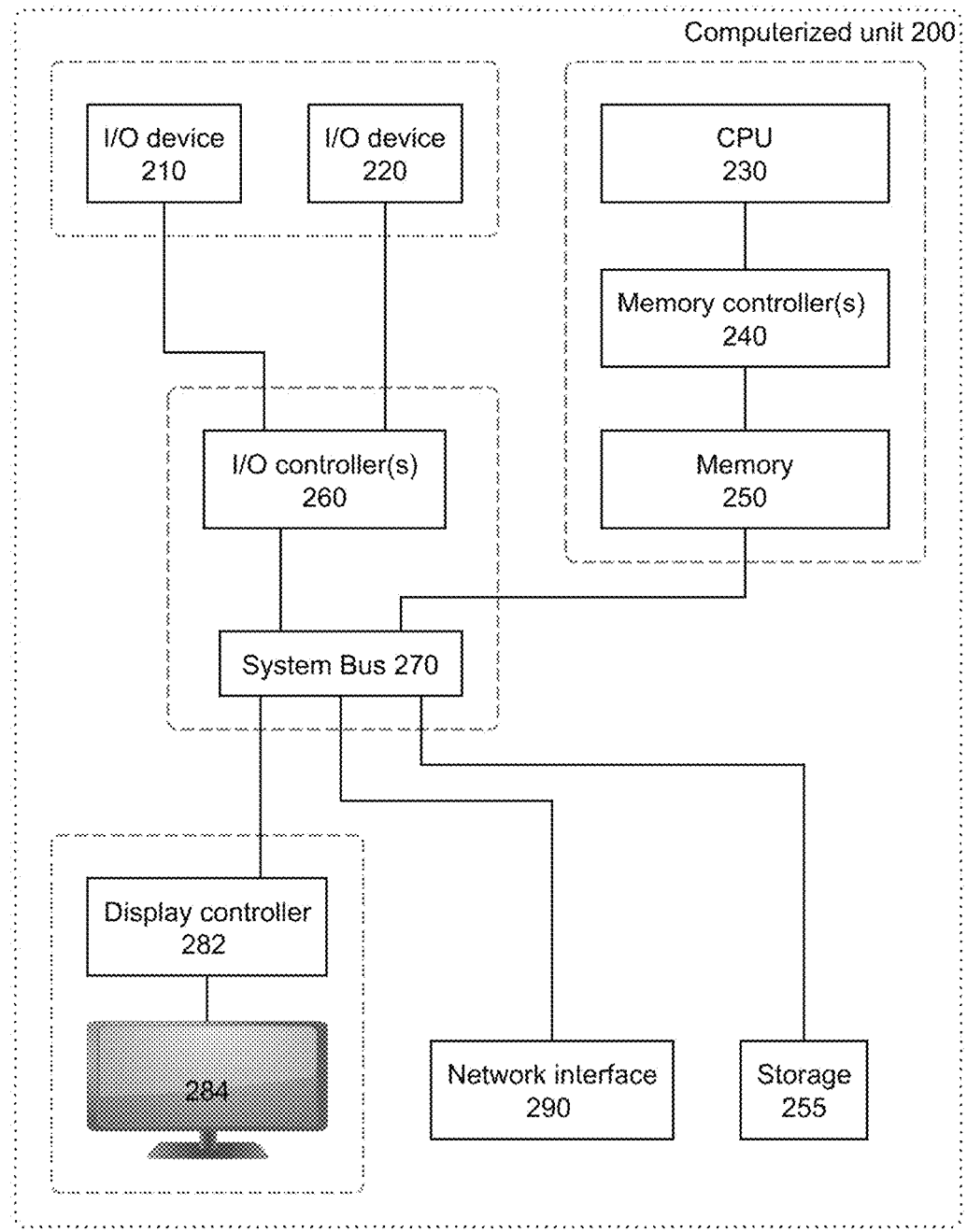
FIG. 6 schematically represents a general-purpose computerized system, suited for implementing method steps as involved in embodiments.

Referring to FIGS. 5 and 6, another aspect of the invention is now described, which concerns a computerized system 200, 202 for planning motion of a vehicle. System 202 is a system embedded in a vehicle 1, whereas system 200 is a general- or special-purpose computer, which may be configured as a simulation system. Both systems 200, 202 are functionally similar; they both include processing means 230, a (main) memory 250, and storage means 255. The latter store suitable computerized methods, which can be loaded in the memory 250, so as to cause the system to take steps as described earlier, i.e., access real-time signals as to positions of N traffic participants, and perform computations via the processing means 230 to plan, at each time step of multiple time steps, motion for the vehicle by estimating and predicting states of the N traffic participants according to the signals accessed, based on the interaction-aware model described earlier. Such systems are described in detail in Section 2.2.

According to another aspect, the invention is embodied as a vehicle 1. FIG. 5 is a functional diagram showing components of the vehicle 1, wherein such components interact to implement steps as described earlier in reference to the present methods. In the example of FIG. 5, the vehicle 1 notably includes several sensors 310, a receiving unit 320, and a computerized system 202 as described above. The sensors 310 are, each, configured to detect events or changes in the environment of the vehicle 1. The sensors accordingly produce signals, which are transmitted to the receiving unit 320. The latter is suitably connected to the sensors 310, so as to be able to receive the sensor signals, in operation. The computerized system 202 is connected to the receiving unit 320, so as to receive signals therefrom, in operation. Note, the signals received by the unit 320 require further processing, in order to be exploited by the interaction-aware algorithm. Thus, in operation, the loaded methods cause the processing means 230 of the system 202 to produce real-time signals as to the positions of the N traffic participants, based on the signals received from the receiving unit 320. Finally, the computerized system 202 need be suitably configured in the vehicle 1 to allow the latter to be actuated according to motion planned S50 by the processing means. E.g., the system 202 may be connected to a motion control unit 360 and instruct the latter to operate the vehicle in a partly or fully autonomous or automated manner, based on signals produced in output of step S50. All required components for enabling such an autonomous or automated vehicle based are known per se.

Next, according to another aspect, the invention can be embodied as a computer program product for planning motion of a vehicle. Basically, the computer program product comprises a computer readable storage medium having program instructions embodied therewith, where the program instructions executable by a plurality of processing means to cause the latter to take steps according to the present methods. Additional considerations as to such computer program products are provided in Section. 2.2.

The above embodiments have been succinctly described in reference to the accompanying drawings and may accommodate a number of variants. Several combinations of the above features may be contemplated. Examples are given in the next section.

2. Specific Embodiments—Technical Implementation Details

2.1 Particularly Preferred Embodiments

Embodiments described below address the problem of predicting the motion of vehicles in the surrounding of an autonomous car, for improved motion planning in lane-based driving scenarios without inter-vehicle communication. First, the problem of single-vehicle estimation is addressed by designing a filtering scheme based on an Interacting Multiple Model Kalman Filter, relying on novel intention-based models. Second, this scheme is augmented with an optimization-based projection that enables the generation of non-colliding predictions. The above ingredients are then used to solve the problem of simultaneously estimating multiple vehicles, which is made real-time capable by using a hierarchical approach based on a priority list. The priority list is dynamically adapted in real time according to a sorting algorithm. The proposed scheme was evaluated in simulations using real-life vehicle data from the Next Generation Simulation (NGSIM) dataset.

2.1.1 Preliminary Remarks

The following describes a motion prediction scheme that uses a hierarchical approach based on a priority list that is dynamically adapted in real time, as discussed in Section 1. This scheme is based on an Interacting Multiple Model Kalman Filter (IMM-KF) for multiple vehicles, which incorporate ideas combining physics-based, manoeuvre-based, and interaction-aware approaches. The proposed scheme is capable of predicting collision-free, interaction-aware trajectories of multiple traffic participants for multiple seconds, with improved error statistics over simpler IMM-KF schemes. The preferred predictor described below consists of three components:
  (i) Intention-based motion models that intuitively capture the behaviour that most drivers exhibit in typical driving scenarios, i.e., velocity tracking and distance keeping from a leading vehicle. Note, this section describes several possible intention-based motion models; however, different or additional intention-based motion models may possibly be fit into the hierarchical scheme;
  (ii) A projection algorithm, which is designed to generate interaction-aware and non-colliding motion predictions. It will be apparent to the one skilled in the art that other projection algorithms may possibly be contemplated and used in the hierarchical scheme; and
  (iii) A time-varying priority list based on the rules of the road that allows for decomposition of the multiple-vehicle motion prediction problem into smaller, tractable single-vehicle problems.

This approach can be tuned with a small amount of data and made computationally real-time capable on typical embedded platforms as available for autonomous driving applications. This scheme is eventually compared with commonly-used, physics-based motion models, using the Next Generation Simulation (NGSIM) dataset.

Notation & Preliminaries

A conjunction (logical AND) is denoted by $\wedge$, a union of sets by $\cup$, and the set of binary numbers $\{0,1\}$ by $\mathbb{B}$. $\mathcal{N}(\mu, \Sigma)$ is the Gaussian distribution with mean $\mu \in \mathbb{R}^n$ and covariance $\Sigma \in \mathbb{R}^{n \times n}$, and $\mathbb{E}[x]$ is the expected value of x. I denotes the identity matrix, 0 denotes a zero vector or matrix, and A>0 denotes a symmetric positive definite matrix.

Kalman Filter: The KF is a state estimator for linear systems [14]:

$$x_{k+1} = F_k x_k + E_k + w_k,$$

$$y_k = H_k x_k + v_k,$$

where $k \in \mathcal{N}$ is the current time, $x_k \in \mathbb{R}^{n_x}$ is the state at time k, $E_k$ is the input, $y_k \in \mathbb{R}^{n_y}$ is the measurement, $w_k \sim \mathcal{N}(0, Q_k)$ is the process noise, and $v_k \sim \mathcal{N}(0, R_k)$ is the measurement noise. $F_k$ and $H_k$ denote the state-transition model and the observation model, respectively. The initial state is $x_0 \sim \mathcal{N}(\mu_{x_0}, \Sigma_{x_0})$. The KF involves a prediction and an update step. The prediction step yields $$\hat{x}_{k|k-1} = F_{k-1}\hat{x}_{k-1|k-1} + E_{k-1}, \tag{1a}$$

$$P_{k|k-1} = F_{k-1}P_{k-1|k-1}F_{k-1}^T + Q_{k-1}; \tag{1b}$$

where $\hat{x}_{k|k-1}$ is the predicted (a priori) state estimate and $P_{k|k-1}$ is the predicted error covariance. The update step is $$\tilde{y}_k = y_k - H_k\hat{x}_{k|k-1}, \tag{2a}$$

$$S_k = H_k P_{k|k-1} H_k^T + R_k, \tag{2b}$$

$$K_k = P_{k|k-1} H_k^T S_k^{-1} \tag{2c}$$

$$\hat{x}_{k|k} = \hat{x}_{k|k-1} + K_k \tilde{y}_k, \tag{2d}$$

$$P_{k|k} = (I - K_k H_k) P_{k|k-1}, \tag{2e}$$

with the innovation residual $\tilde{y}_k$ and its covariance $S_k$, the Kalman gain $K_k$, the (a posteriori) state estimate $\hat{x}_{k|k}$, and the estimate covariance $P_{k|k}$, where $\hat{x}_{0|} = \mu_{x_0}$, $P_{0|0} = \Sigma_{x_0}$.

Interacting Multiple Model Kalman Filter: The IMM-KF is an estimation scheme for hybrid systems [15]. Consider the discrete Markov jump linear system:

$$x_{k+1} = F_k^{(i)} x_k + E_k^{(i)} + w_k^{(i)},$$

$$y_k = H_k^{(i)} x_k + v_k^{(i)},$$

where (i) denotes the currently active model $m_k$ from the model set: $M = \{m^{(1)}, \ldots, m^{(M)}\}$. The transition from model $m^{(i)}$ to $m^{(j)}$ is described through a Markov chain, i.e., the probability of transitioning from $m^{(i)}$ to $m^{(j)}$ is $$Pr(m_{k+1} = m^{(j)} | m_k = m^{(i)}) = \pi_{ij}, \tag{3}$$

where $m_k \in \mathcal{M}$ is the model active at time k and $\pi_{ij} \in [0,1]$ is the transition probability. An advantage of using an IMM-KF is that separate filters can be used (in parallel) for each $m^{(i)}$ and their estimates are then utilized to estimate the probability of each $m^{(i)}$ being active. The IMM-KF involves an interaction, a filtering, a probability update, and a combination step. In the interaction step, the individual filter estimates are mixed and used to initialize each filter:

$$c^{(i)} = \sum_{j=1}^{M} \pi_{ji} \mu_{k-1}^{(j)}, \tag{4a}$$

$$\mu_{k-1|k-1}^{(j|i)} = \frac{\pi_{ji} \mu_{k-1}^{(j)}}{c^{(i)}}, \tag{4b}$$

$$\bar{x}_{k-1|k-1}^{(i)} = \sum_{j=1}^{M} \mu_{k-1|k-1}^{(j|i)} \hat{x}_{k-1|k-1}^{(j)}, \tag{4c}$$

$$\bar{P}_{k-1|k-1}^{(i)} = \sum_{j=1}^{M} \mu_{k-1|k-1}^{(j|i)} \left( P_{k-1|k-1}^{(j)} + X_{k-1|k-1}^{(i,j)} \right) \tag{4d}$$

wherein $$X_{k|k}^{(i,j)} = (x_{k|k}^{(i)} - x_{k|k}^{(j)})(x_{k|k}^{(i)} - x_{k|k}^{(j)})^T$$

and $\mu_{k-1|k-1}^{(j|i)}$ is the conditional model probability for transitioning from $m^{(j)}$ to $m^{(i)}$, $\hat{x}_{k-1|k-1}^{(i)}$ is the state estimate of each filter, $p_{k-1|k-1}^{(i)}$ its covariance, $\bar{x}_{k-1|k-1}^{(i)}$ denotes the mixing of the state estimates, and $\bar{p}_{k-1|k-1}^{(i)}$ its covariance. In the filtering step, each of the M filters is executed separately; as in (1) and (2), to obtain the innovation residuals $\tilde{y}_k^{(i)}$ and their covariances $S_k^{(i)}$, as well as $\hat{x}_{k|k}^{(i)}$ with covariances $p_{k|k}^{(i)}$.

In the probability update step, the filters' innovation residuals are used to update the model probabilities $$\hat{x}_{k|k} = \sum_{i=1}^{M} \mu_k^{(i)} \hat{x}_{k|k}^{(i)}, \tag{6a}$$

$$P_{k|k} = \sum_{i=1}^{M} \mu_k^{(i)} \left( P_{k|k}^{(i)} + (\hat{x}_{k|k} - \hat{x}_{k|k}^{(i)})(\hat{x}_{k|k} - \hat{x}_{k|k}^{(i)})^T \right). \tag{6b}$$

where $L_{k|k}^{(i)}$ is the likelihood of the observation using $\tilde{y}_k^{(i)}$ and the updated model probability $\mu_k^{(i)}$.

In the combination step, the filters' state estimates and their covariances are mixed, weighted by the updated model probabilities: (6a)

$$\hat{x}_{k|k} = \sum_{i=1}^{M} \mu_k^{(i)} \hat{x}_{k|k}^{(i)}, \tag{6a}$$

$$P_{k|k} = \sum_{i=1}^{M} \mu_k^{(i)} \left( P_{k|k}^{(i)} + (\hat{x}_{k|k} - \hat{x}_{k|k}^{(i)})(\hat{x}_{k|k} - \hat{x}_{k|k}^{(i)})^T \right). \tag{6b}$$

2.1.2 Problem Statement

Consider the problem of estimating and predicting the state of N vehicles. In Bayesian estimation terms, the aim is to calculate the Probability Density Function (PDF)

$$p(x_{k:k-T}^{1:N} | y_{1:k}^{1:N}) \tag{7}$$

where $k \in \mathcal{N}$ is the current time, $x_k^\eta \in \mathbb{R}^{n_x}$ is the state of the $\eta$-th vehicle to be estimated and $x_{K+1:k+T}^\eta$ are its future states to be predicted, $y_{1:k}^\eta$ are measurements, and $T \in \mathbb{N}_{N>0}$ is the prediction horizon. Working under the assumption of real traffic being collision-free, the aim is for the predicted trajectories to exhibit the same behaviour. Let the area occupied by the $\eta$-th vehicle be $\mathcal{P}^\eta(x_k^\eta) \in \mathbb{R}^2$. The condition of vehicle $\eta$ not colliding with vehicle $v$ is formulated as $\mathcal{P}^\eta(x_k^\eta) \cap \mathcal{P}^\eta(x_k^v) = \emptyset$. Hence, the requirement of generating non-colliding predictions is formally stated as $$\bigcup_{t=k+1}^{k+T} \mathcal{P}^\eta\left(\mathbb{E}\left[x_t^\eta \mid y_{1:k}^{1:N}\right]\right) \cap \mathcal{P}^v\left(\mathbb{E}\left[x_t^v \mid y_{1:k}^{1:N}\right]\right) = \emptyset \, \forall \, \eta \neq v, \tag{8}$$

i.e., the non-collision requirement is enforced in expectation.

The rest of this section is organized as follows. First, the sub-problem of estimating and predicting a single vehicle is addressed, under the assumption that the trajectories of the other traffic participants are known (Section 2.1.3). Then, multiple vehicles are estimated and predicted using a hierarchical approach that uses priorities in order to formulate the multiple-vehicle problem as N single-vehicle estimation and prediction problems (Section 2.1.4).

2.1.3 Single-Vehicle Estimation

For a single vehicle with index N, (7) simplifies to $$p(x_{k:k+T}^N | y_{1:k}^N, x_{1:k+T}^{1:N-1}).$$

In order to ease exposition, the index N is omitted from $x_k^N$, $y_k^N$ and the other vehicles' states are denoted by $x_k^{1:N-1}$ by $x_k$.

The vehicle's behaviour is modelled as linear, time-varying with $$x_{k+1}=F_k(x_k,z_k)x_k+g_k(x_k,z_k), \quad (9)$$

where $z_k$ denotes all external variables that affect the driver's behaviour, such as the intention of the driver (e.g., what speed to maintain, whether to change lanes, etc.). Modelling the exact dependence between the vehicle's state $x_k$ and the environment $z_k$ is in general intractable and context-dependent. The following addresses lane-based driving scenarios, for the sake of illustration. However, other scenarios can similarly be contemplated, involving different manoeuvre models. The lane-based driving scenarios are structured and allow (9) to be approximated with a finite set of manoeuvre models, or manoeuvres for short, $M=\{m^{(1)}, \ldots, m^{(M)}\}$ modelled as linear and time-varying:

$$x_{k+1}=F_k^{(i)}(x_k)x_k+E_k^{(i)}(x_k)+w_k^{(i)} \quad (10)$$

where $i=1, \ldots, M$ denotes which of the models $m^{(1)}, \ldots, m^{(M)}$ is active at time k. The process noise accounts for the modelling errors introduced by the approximation in (10). One models the transitions between the different models of $\mathcal{M}$ as described by (3) allowing for estimating the active model mx with an IMM-KF. For generating predictions, the most likely model m is used, i.e., $$m = \arg\max_i \mu_k^{(i)}. \quad (11)$$

A. Intention-Based Motion Models

In the following, it is proposed to use intention-based motion models $m^{(i)}$ in (10). Each motion model corresponds to a specific manoeuvre of a vehicle and the IMM-KF is used to identify which of the motion models is active.

1) Longitudinal motion: two longitudinal motion models are proposed, Velocity Tracking (VT) and Distance Keeping (DK), with the longitudinal state $$x_{lon,k}:=[p_{lon,k}\ v_{lon,k}\ a_{lon,k}]^T,$$

where $p_{lon,k}$, $v_{lon,k}$, $a_{lon,k} \in \mathbb{R}$ are the longitudinal position, velocity, and acceleration, respectively.

Velocity tracking: The VT model captures driving manoeuvres in which the traffic participant tracks a certain velocity reference. The VT vehicle dynamics is given by $$x_{lon,k+1} = \begin{bmatrix} 1 & T_s & T_s^2/2 \\ 0 & 1 & T_s \\ 0 & 0 & 1 \end{bmatrix} x_{lon,k} + \begin{bmatrix} 0 \\ T_s^2/2 \\ T_s \end{bmatrix} u_{lon,k}^{(VT)},$$

where $T_s \in \mathbb{R}_{>0}$ is the sampling time and $u_{lon,k}^{(VT)} \in \mathbb{R}$ is the control input that represents the intention of a driver to track a velocity. The VT driver input is modelled as an LQR-based feedback controller to track the target reference velocity:

$$u_{lon,k}^{(VT)}=-K_{LQR}^{(VT)}([v_{lon,k}\ a_{lon,k}]^T-[v_{ref,k}\ 0]^T)$$

with the velocity reference $v_{ref,k}$. As the intended velocity reference $v_{ref,k}$ of the driver is unknown, the state $x_{lon,k}$ is augmented such that both $x_{lon,k}$ and $v_{ref,k}$ are estimated simultaneously. Overall, the VT model for the filter design is given by $$\begin{bmatrix} x_{lon,k+1} \\ v_{ref,k+1} \end{bmatrix} = F_{lon}^{(VT)}(K_{LQR}^{(VT)}) \begin{bmatrix} x_{lon,k} \\ v_{ref,k} \end{bmatrix} + w_k^{(VT)}, \quad (12)$$

where $w_k^{(VT)}$ allows for tracking variations in $v_{ref,k}$.

Distance keeping: The DK model captures cruise-control manoeuvres in which a traffic participant keeps a specific distance from a leading vehicle. The discrete-time dynamics of the DK model is $$\tilde{x}_{lon,k+1} = \begin{bmatrix} 1 & T_s & T_s^2/2 \\ 0 & 1 & T_s \\ 0 & 0 & 1 \end{bmatrix} \tilde{x}_{lon,k} + \begin{bmatrix} T_s^3/6 \\ T_s^2/2 \\ T_s \end{bmatrix} u_{lon,k}^{(DK)}$$

$$\tilde{x}_{lon,k} = x_{lon,k} - x_{lead,k},$$

where $u_{lon,k}^{(DK)} \in \mathbb{R}$ is the driver's control input for the DK model and $x_{lead,k}$ is the longitudinal state of the leading vehicle. The DK input is modelled as an LQR controller to track a longitudinal time gap $t_{gap,k}$ to a leading vehicle $$u_{lon,k}^{(DK)}=-K_{LQR}^{(DK)}(\tilde{x}_{lon,k}-[-v_{lead,k}t_{gap,k}\ 0\ 0]^T).$$

Similarly to (12), one augments the state with the reference time gap $t_{gap,k}$ to be estimated and thus, the DK model for the filter design is given by $$\begin{bmatrix} x_{lon,k+1} \\ t_{gap,k+1} \end{bmatrix} = F_{lon}^{(DK)}(K_{LQR}^{(DK)}, \chi_k) \begin{bmatrix} x_{lon,k} \\ t_{gap,k} \end{bmatrix} + E_{lon}^{(DK)}(K_{LQR}^{(DK)}, \chi_{k:\ k+1}) + w_k^{(DK)}. \quad (13)$$

2) Lateral motion: lateral manoeuvres are modelled with multiple Lane Changing (LC) motion models, which involve the lateral state $$x_{lat,k}:=[p_{lat,k}\ v_{lat,k}\ a_{lat,k}]^T,$$

where $p_{lat,k}$, $v_{lat,k}$, $a_{lat,k} \in \mathbb{R}$ are the lateral position, velocity, and acceleration, respectively. The total number of lateral models $m^{(LC)}$ is in general equal to the number of lanes of the road. However, here one focuses only on lane change manoeuvres of up to one lane at a time, effectively leading to three $m^{(LC)}$ models: one for staying on the lane, one for a lane change manoeuvre to the left, and one for a lane change to the right, denoted $m^{(LC1)}$, $m^{(LC2)}$, and $m^{(LC3)}$, respectively. This is a reasonable assumption as manoeuvres with multiple, consecutive lane changes are captured by the algorithm due to its recursive implementation, i.e., as soon as a lane change is detected, the algorithm can predict a subsequent lane change at the next sampling time.

The LC model captures lateral driving manoeuvres in which the vehicle tracks the lateral position of a lane. The discrete-time dynamics of the LC model are modelled as $$x_{lat,k+1} = \begin{bmatrix} 1 & T_s & T_s^2/2 \\ 0 & 1 & T_s \\ 0 & 0 & 1 \end{bmatrix} x_{lat,k} + \begin{bmatrix} T_s^3/6 \\ T_s^2/2 \\ T_s \end{bmatrix} u_{lat,k}^{(LC)}$$

where $u_{lat,k}^{(LC)} \in \mathbb{R}$ is the driver's control input used to track a certain lane. Again, one assumes that the driver employs a linear feedback controller to converge to a reference lane $$u_{lat,k}^{(LC)}=-K_{LQR}^{(LC)}(x_{lat,k}-[p_{ref}\ 0\ 0]^T),$$

[16]. In order to make the lane-change manoeuvre as realistic as possible, an inverse optimal control scheme [17] can be used to learn $K_{LQR}^{(LC)}$ from vehicle data from the NGSIM dataset. Finally, the VT model for the filter design is $$x_{lat,k+1} = F_{lat}^{(LC)}(K_{LQR}^{(LC)})x_{lat,k} + E_{lat}^{(LC)}(K_{LQR}^{(LC)}, p_{ref}) + w_k^{(LC)},$$

where $w_k^{(LC)}$ allows for tracking variations in the reference lane's lateral position.

3) Joint motion: Finally, the three lateral motion models are combined with the two proposed longitudinal motion models, i.e., in total there are six manoeuvres in our filter design: $\mathcal{M} = \{$VT-LC1, VT-LC2, VT-LC3, DK-LC1, DK-LC1, DK-LC1$\}$. Again, additional, less, or different manoeuvres may similarly be contemplated.

The joint motion models involve the full state of the vehicle $x_k := [x_{lon,k}^T x_{lat,k}^T]^T$ as a common state shared among models.

Each model, however, has its own separate full state $x_k^{(i)}$ related to the common state through $x_k = V x_k^{(i)}$, where $x_k^{(i)} \in \mathbb{R}^{n_x^{(i)}}$ is the full state of model $m^{(i)}$ and $V$ is a selection matrix. In the present case, $n_x^{(i)} = 7$ and $V \in \mathbb{R}^{6 \times 7}$ is the matrix that selects all states but the reference states $v_{ref,k}$ and $t_{gap,k}$. The joint motion dynamics of each model is given by $$x_{k+1}^{(i)} = F_k^{(i)} x_k^{(i)} + E_k^{(i)} + w_k^{(i)},$$

where each $F_k^{(i)}$, $E_k^{(i)}$ corresponds to one of the six maneuvers in the filter design and consists of a longitudinal and a lateral motion model:

$$F_k = \begin{bmatrix} F_{lon,k} & 0 \\ 0 & F_{lat,k} \end{bmatrix}, E_k = \begin{bmatrix} E_{lon,k} \\ E_{lat,k} \end{bmatrix}.$$

B. Non-Colliding Predictions for Single Vehicle

The following shows how to use the six proposed intention-based motion models to generate non-colliding predictions. As only the most probable model m is used in the prediction step, the index m can be omitted in the exposition.

1) Distribution of predictions: First, the distribution of the motion predictions is derived. Given that the state estimate is Gaussian distributed with $$p(x_k|y_{1:k}, x_{1:k+T}^{1:N-1}) = N(\hat{x}_{k|k}, P_{k|k})$$

and the proposed filter models are linear, the propagated state predictions are also Gaussian:

$$p(x_t|y_{1:k}, x_{1:k+T}^{1:N-1}) = N(\hat{x}_{t|k}, P_{t|k})$$

for $t = k+1, \ldots, k+T$, where the state predictions $\hat{x}_{t|k}$ and the covariance matrices $P_{t|k}$ are given by $$\hat{x}_{t|k} = \Phi(t, k)\hat{x}_{k|k} + \sum_{i=k+1}^{t} \Phi(t, i)E_i, \quad (14a)$$

$$P_{t|k} = \Phi(t, k)P_{k|k}\Phi(t, k)^\top + \sum_{i=k+1}^{t} \Phi(t, i)Q_i\Phi(t, i)^\top, \quad (14b)$$

$$\Phi(t, i) = \begin{cases} \left(\prod_{j=i}^{t-1} F_j^\top\right)^\top & \text{if } t > i \\ I & \text{if } i = i \end{cases} \quad (14c)$$

Collision constraints: Next, one formulates a non-collision condition that is subsequently used as constraint in an optimization framework. The geometrical shape of vehicles is modelled as rectangles with constant and known width $W^i$ and length $L^i$ of the i-th vehicle. For the single vehicle N, the condition in (8) simplifies to $$\bigcup_{t=k+1}^{k+T} \mathcal{P}^N(\hat{x}_{t|k}) \cap \mathcal{P}^\eta(x_k^\eta) = \emptyset \quad \forall \eta = 1, \ldots, N-1 \quad (15)$$

with the motion prediction of vehicle N given by $$\hat{x}_{t|k} = \mathbb{E}[x_t|y_{1:k}, x_{1:k+T}^{1:N-1}].$$

Due to the structure of the lateral motion models in Section 2.1.3-A.2, each model corresponds to a specific lane. Hence, the model m that is used for generating the predictions fully defines the predicted lateral position $\hat{p}_{lat,t}$ of the vehicle.

Thus, (15) is equivalent to satisfying $$\bigwedge_{t \in \mathcal{I}\eta}\left(|\hat{p}_{lon,t|k} - p_{lon,t}^\eta| > \frac{L^N + L^\eta}{2}\right) \forall \eta = 1, \ldots, N-1 \quad (16)$$

with the index set $$\mathcal{I}^\eta = \left\{t = k+1, \ldots, k+T : |\hat{p}_{lat,t|k} - p_{lat,t|k}^\eta| \leq \frac{W^N + W^\eta}{2}\right\}$$

defining the time indices in which two vehicles are laterally close to each other. Intuitively, (16) states that for all time steps in which two vehicles are laterally close to each other, the vehicles must not be close longitudinally. Next, one uses the condition in (16) as constraint in our optimization-based projection to generate non-colliding motion predictions.

3) Estimate projection: In order to obtain non-colliding predictions satisfying (16), one projects the state estimate in (14a) as follows:

$$\min_{x \in \mathbb{R}^{n_x}} (x - \hat{x}_{k|k})^\top W (x - \hat{x}_{k|k}) \quad (17a)$$

$$\text{s.t. } \hat{x}_{t|k} = \Phi(t, k)x + \sum_{i=k+1}^{t} \Phi(t, i)E_i \quad (17b)$$

$$\hat{x}_{t|k} \text{ satisfies (16) } \forall t = k+1, \ldots, k+T, \quad (17c)$$

where one chooses $W > 0$ such that the projection of the reference estimates $v_{ref}$ and $t_{gap}$ is encouraged rather than $x_{lon}$ and $x_{lat}$, i.e., one incorporates a non-collision intention into $v_{ref}$ and $t_{gap}$. The non-convex optimization problem (17) is not in a form that can be directly handled by off-the-shelf optimization solvers because of the disjunctions in (17c). However, (17) can be reformulated into a tractable, equivalent Mixed-Integer Quadratic Program (MIQP), e.g., using the Big-M method [18]:

$$\min_{x \in \mathbb{R}^{n_x}, x_\eta t \in \mathbb{B}} (x - \hat{x}_{k|k})^\top W (x - \hat{x}_{k|k}) \quad (18a)$$

$$\text{s.t. } \hat{x}_{t|k} = \Phi(t, k)x + \sum_{i=k+1}^{t} \Phi(t, i)E_i \quad (18b)$$

$$\hat{p}_{lon,t|k} \geq (p_{lon,t}^\eta + \overline{L}^\eta)z_{\eta,t} - M(1 - z_{\eta,t}) \quad (18c)$$

$$\hat{p}_{lon,t|k} \leq (p_{lon,t}^\eta + \overline{L}^\eta)(1 - z_{\eta,t}) + Mz_{\eta,t} \quad (18d)$$

for all $\eta = 1, \ldots, N-1$ and $\tau \in \mathcal{I}^\eta$, where $$\bar{L}^\eta = \frac{L^N + L^\eta}{2}.$$

As a result, the motion prediction $$\hat{x}_{t|k} = \Phi(t,k)\hat{x}_{k|k}^{proj} + \sum_{i=k+1}^{t} \Phi(t,i)E_i \quad (19)$$

satisfies (15), where $\hat{x}_{k|k}^{proj}$ is the minimizer of (18).

4) Projection pseudo-measurement: The minimizer $\hat{x}_{k|k}^{proj,(i)}$ of (18) realizes non-colliding predictions for each motion model $m^{(i)}$. Additionally, one may want to explicitly consider the non-colliding motion predictions in the IMM-KF for choosing the prediction model $m^{(i)}$ as in (11), i.e., if a manoeuvre exhibits high projection cost in (18a), it should be considered less likely. In order to make the models whose unprojected manoeuvres exhibit collisions less probable, one augments the physical measurements' residuals $\tilde{y}_k^{(i)}$ of each model $m^{(i)}$ with the pseudo-measurement $$\tilde{y}_{pseudo,k}^{(i)} = (\hat{x}_{k|k}^{proj,(i)} - \hat{x}_{k|k}^{(i)})^T W(\hat{x}_{k|k}^{proj,(i)} - x_{k|k}^{(i)}) \quad (20)$$

and use the augmented residual and augmented covariance to compute the likelihood $L_k^{(i)}$ in (5a):

$$\tilde{y}_{aug,k}^{(i)} = \begin{bmatrix} \tilde{y}_k^{(i)} \\ \tilde{y}_{pseudo,k}^{(i)} \end{bmatrix}, S_{aug,k}^{(i)} = \begin{bmatrix} S_k^{(i)} & 0 \\ 0 & S_{pseudo,k}^{(i)} \end{bmatrix}.$$

Remark 1: The estimates $\hat{x}_{k|k}^{(i)}$ of the filters are not altered by the pseudo-measurement; they are only altered by the motion predictions and the IMM-KF's probability estimates $\mu_k^{(i)}$.

Remark 2: The minimizers of (17) and (18) are equivalent if M is larger than any possible constraint value (Big-M), i.e., $$M \geq \hat{p}_{lon,t|k} \forall t=k+1 \ldots k+T.$$

Remark 3: In this section, one considers motion predictions with up to one lane change over the prediction horizon. Hence, the predicted vehicle cannot be both in front and in the back of vehicle n over the prediction horizon as such a manoeuvre would require two lane changes. As a consequence, one can fix $$z_{\eta,t} = z_\eta \forall t=k+1, \ldots, k+T$$

in (18), which reduces the number of binary variables to one per vehicle n and renders (18) computationally more efficient.

Remark 4: Problem (18) can be solved efficiently as $n_x$ is small and algorithms are available, which solve combinatorial problems efficiently, e.g., branch and bound techniques [19]. Section 2.1.5 highlights the algorithm's real-time capabilities and provides computation times.

Remark 5: The term "projection" can be defined as follows. Equation 16 describes the non-collision constraint for a predicted trajectory. In general, the predictions may not be collision-free, which is something that one nevertheless wants to achieve. One may do so by creating a "projection optimization problem", Problem 17, which finds an alternative prediction (x, in Problem 17), which:

Is as close as possible to the original prediction made ($\hat{x}_{k|t}$, in eq. 17a).

Satisfies the no-collision constraint of Eq. 16 mentioned above (according to Eq. 17c).

In optimization problems the terms "feasible region" or "feasible set" are used to designate all possible solutions to the problem that satisfy the constraint. With this in mind, the term "projection" is defined as a point and/or a solution that belongs to the aforementioned feasible set, while also being "as close as possible" to the original point, which is likely outside the feasible set, else the projection is the same as the original point. The term "close" is defined via a "distance-like" function that takes as inputs the original and the projected point and returns a number describing how close those points are. This function is here taken as the objective of Eq. 17a.

C. Overall Algorithm for Single Vehicle

Algorithm 1 summarizes the single-vehicle procedure given the obstacle vehicles' trajectories $x_{k:k+T}^{1:N-1}$, where Steps 2-6 pertain to the state estimation and Steps 7-11 to the motion prediction.

| Algorithm 1 Single-vehicle estimation: recursion, time k |
|---|
| 1: input: $y_k$, $\hat{x}_{k-1|k-1}^{(i)}$, $P_{k-1|k-1}^{(i)}$, $\mu_{k-1}^{(i)}$, $x_{k:k+T}^{1:N-1}$ |
| 2: Run interaction step of IMM-KF (4) |
| 3: Re-init. KFs with $\bar{x}_{k-1|k-1}^{(i)}$, $\bar{P}_{k-1|k-1}^{(i)}$ $\forall m^{(i)}$ |
| 4: Run KF (1), (2) $\forall m^{(i)}$ |
| 5: Project (18) and get pseudo measurement (20) $\forall m^{(i)}$ |
| 6: Run IMM-KF (5), (6) $\forall m^{(i)}$ |
| 7: Find most probable model m ← arg max$_i$ $\mu_k^{(i)}$ |
| 8: Project state estimate $\hat{x}_{k|k}^{(m)}$ for model m, $\hat{x}_{k|k}^{proj}$ ← (18) |
| 9: for t ← k + 1, . . . , k + T |
| 10: Predict $\hat{x}_{t|k}^{(m)}$, $P_{t|k}^{(m)}$ with (14), (19) for model m |
| 11: Compute $\hat{x}_{t|k}^{(m)}$, $P_{t|k}$ ← $V\hat{x}_{t|k}^{(m)}$, $VP_{t|k}^{(m)}V^T$ |
| 12: return: $\hat{x}_{k:k+T}$, $P_{k:k+T}$, $\hat{x}_{k|k}^{(i)}$, $P_{k|k}^{(i)}$, $\mu_k^{(i)}$ |

That is, Algorithm 1 takes $y_k$, $\hat{x}_{k-1|k-1}^{(i)}$, $P_{k-1|k-1}^{(i)}$, $\mu_{k-1}^{(i)}$, and $x_{k:k+T}^{1:N-1}$ as inputs, which respectively correspond to the measurement (at time k), the state estimate of each filter (as of time k−1), its covariance, the model probability (as previously updated at k−1), and the obstacle vehicles' trajectories. The algorithm returns, $\hat{x}_{k:k+T}$, $P_{k:K+T}$, $\hat{x}_{k|k}^{(i)}$, $P_{k|k}^{(i)}$, and $\mu_k^{(i)}$, i.e., the state prediction to horizon T, the covariance of the predictions, the state estimate of each filter (at time k), its covariance, and the model probability (as now updated at time k). Note, $y_k$ is measured at time k.

2.1.4 Priority-Based Multiple-Vehicle Estimation

Multiple-vehicle estimation is addressed in a hierarchical approach, where the hierarchy is given by a priority list and adapted to a dynamical context, using a suitable sorting algorithm, for example inspired from the bubble sort algorithm [20]. The proposed sorting procedure exploits the rules of the road in which trailing vehicles must avoid collisions with a leading vehicle.

As discussed in Section1, one may notably adopt the following sorting strategy:

If two vehicles are on the same lane, the vehicle in front has a higher priority.

If two vehicles are on different lanes, the one with larger longitudinal progress over the prediction horizon T has higher priority.

It is easy to see that it is always possible to derive a sorted list $l^{sort}$ using the two criteria above. Formally, the priority list is stated as $$l^{sort} = [l^1, l^2, \ldots, l^{N-1}, l^N], \quad (21)$$

where $l^j=\eta$ indicates that vehicle n has priority j. Note that priority 1 is the highest and priority N is the lowest. Consequently, the obstacle vehicles that vehicle n encounters are given by the subset of vehicles $$\mathcal{L}^\eta := \{l^1, \ldots, l^{\eta-1}\} \qquad (22)$$

This hierarchical approach allows the multiple-vehicle estimation problem to be decoupled into multiple single-vehicle estimation problems that are tractably evaluated as in Section 2.1.3, which is shown in Lemma 1 with proof in fine.

Lemma 1: The Bayesian tracking problem of the PDF in (7) can be decomposed into N separate Bayesian tracking problems using the priority list in (21).

Algorithm 2 summarizes the overall recursive procedure for the estimation and motion prediction of multiple vehicles.

---

Algorithm 2 Multiple-vehicle estimation: recursion, time k

---

1:    input: $l^{sort}$, $y_k^{1:N}$, $\hat{x}_{k-1|k-1}^{1:N}$, $P_{k-1|k-1}^{1:N}$, $\mu_{k-1}^{1:N}$
2:    for $\eta \leftarrow 1^1, \ldots, 1^N$     ▷ descending priority order
3:       obstacles $\leftarrow \hat{x}_{k:k+T|k}^{l_{1:\eta-1}}$
4:       $\hat{x}_{k:k+T|k}^\eta$, $P_{k:k+T|k}^\eta \leftarrow$ Single-Veh. Est. ▷ Alg. 1
5:    $l^{sort} \leftarrow$ Priority List Sort
6:    return $l^{sort}$, $\hat{x}_{k:k+T}^{1:N}$, $P_{k:k+T}^{1:N}$

---

Accordingly, Algorithm 2 takes $l^{sort}$, $y_k^{1:N}$, $\hat{x}_{k-1|k-1}^{1:N}$, $p_{k-1|k-1}^{1:N}$, and $\mu_{k-1}^{1:N}$, as inputs, which respectively correspond to the priority list (as of time k), the measurement (at time k), the state estimate of each filter (as of time k−1) measurement (at time k), the state estimate of each filter (as of time k−1), its covariance, and the model probability (as previously at k−1). Note, the obstacle vehicles' trajectories are required at Step 3, for the single-vehicle estimation to proceed according to Algorithm 1. The priority list can then be updated at Step 5, so as for Algorithm 2 to return the updated list $l^{sort}$, the state estimates $\hat{x}_{k:k+T}^{1:N}$, and their covariances.

The following proves Lemma 1.

Proof: Without loss of generality, let the priority list 1 in (21) be sorted in ascending order according to the vehicles' indices. Then, the index sets in (22) take the form $$\mathcal{L}^\eta = \{1, \ldots, \eta-1\} \forall_\eta = 1, \ldots, N. \qquad (23)$$

The PDF in (7) is evaluated as $$p(x_k^{1:N} \mid y_{1:k}^{1:N}) = \sum_{m_k^{1:N}} p(x_k^{1:N}, m_k^{1:N} \mid y_{1:k}^{1:N}).$$

Using Bayes' theorem yields $$p(x_k^{1:N}, m_k^{1:N} \mid y_{1:k}^{1:N}) = \frac{p(y_k^{1:N} \mid x_k^{1:N}, m_k^{1:N}) p(x_k^{1:N}, m_k^{1:N} \mid y_{1:k-1}^{1:N})}{p(y_k^{1:N} \mid y_{k-1}^{1:N})},$$

where $p(y_k^{1:N} \mid y_{k-1}^{1:N})$ is a normalization constant that can be readily calculated, and $$p(y_k^{1:N} \mid x_k^{1:N}, m_k^{1:N}) = \prod_{\eta=1}^{N} p(y_k^\eta \mid x_k^\eta, m_k^\eta).$$

Further, marginalizing over $x_{k-1}^{1:N}$ and $m_{k-1}^{1:N}$ yields $$p(x_k^{1:N}, m_k^{1:N} \mid y_{1:k-1}^{1:N}) = \int \sum_{m_{k-1}^{1:N}} p(x_k^{1:N}, m_k^{1:N}, x_{k-1}^{1:N}, m_{k-1}^{1:N} \mid y_{1:k-1}^{1:N}) dx_{k-1}^{1:N}$$

where, using conditional probabilities and the Bayesian network's structure, yields $$p(x_k^{1:N}, m_k^{1:N}, x_{k-1}^{1:N}, m_{k-1}^{1:N} \mid y_{1:k-1}^{1:N}) =$$

$$p(x_k^{1:N}, m_k^{1:N} \mid x_{k-1}^{1:N}, m_{k-1}^{1:N}, y_{1:k-1}^{1:N}) p(x_{k-1}^{1:N}, m_{k-1}^{1:N} \mid y_{1:k-1}^{1:N}) =$$

$$p(x_k^{1:N}, m_k^{1:N} \mid x_{k-1}^{1:N}, m_{k-1}^{1:N}) p(x_{k-1}^{1:N}, m_{k-1}^{1:N} \mid y_{1:k-1}^{1:N}).$$

The term $p(x_{k-1}^{1:N}, m_{k-1}^{1:N} \mid y_{1:k-1}^{1:N})$ is known due to the recursive nature of the employed Bayesian tracking scheme and $$p(x_k^{1:N}, m_k^{1:N} \mid x_{k-1}^{1:N}, m_{k-1}^{1:N}) = \prod_{\eta=1}^{N} p(x_k^\eta, m_k^\eta \mid x_{k-1}^{1:N}, m_{k-1}^{1:N}, x_k^{1:\eta-1}, m_k^{1:\eta-1}), \qquad (24)$$

as one can evaluate the individual PDFs of (24) in hierarchical order according to (23).

Finally, the predictions of the vehicles' states $x_{k+1:k+T}^{1:N}$ can be evaluated by repeating (in hierarchical order) the IMM-KF steps for each vehicle.

2.1.5 Simulation Results

A. Illustrative Example

The inventors have examined various synthetic scenarios to illustrate the method, which have shown that the above approach improves predictions over CV-CA and VT-DK models.

B. Real-Life Vehicle Data

In order to systematically evaluate the overall performance of our method, the inventors have used the NGSIM 1-80 dataset [21], which consists of 45 minutes of vehicle trajectory data with 0.1 s sampling time. They have extracted specific test cases from the dataset that correspond to typical highway driving scenarios: cruise control and lane change. In total, they have predicted 244 cruise control and 115 lane change scenarios with prediction horizons of 1 s, 2 s, 3 s, and 4 s.

Figure 3:
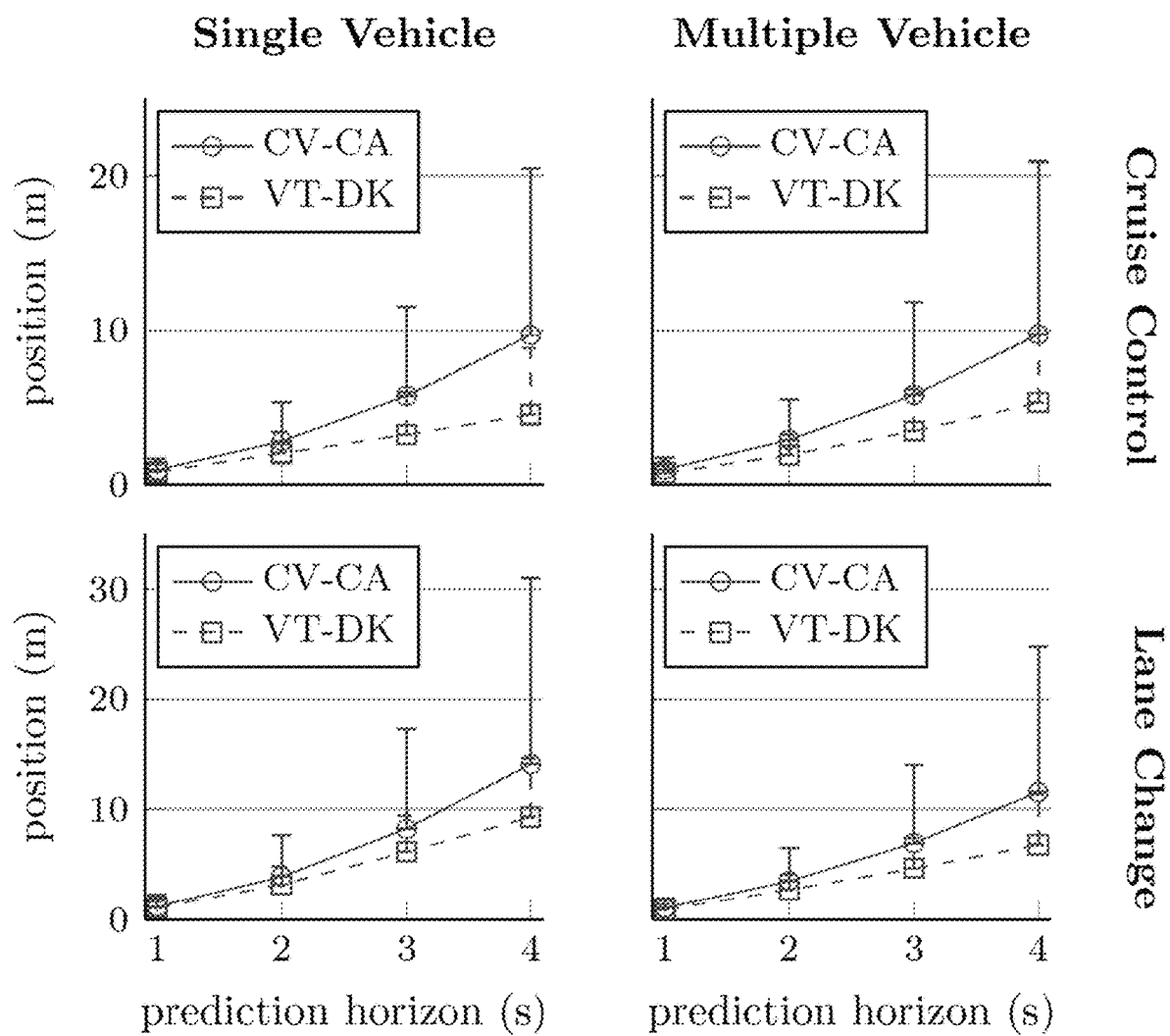
FIG. 3 compares the predicted motion plans resulting from a method according to embodiments, based on Constant Velocity (CV)-Constant Acceleration (CA) models, with plans resulting from Constant Velocity (CV)-Constant Acceleration (CA) models. It presents the means as well as the standard deviations of the position prediction errors at the end of the prediction horizon. It actually plots longitudinal position prediction errors using CV-CA models (circles) and VT-DK models (squares) and their corresponding standard deviations, for prediction horizons of 1 s, 2 s, 3 s, and 4 s. The results are obtained from single/multiple-vehicle predictions of many cruise control/lane change scenarios from the Next Generation Simulation (NGSIM) dataset. See text.

FIG. 3 compares the predicted motion plans resulting from Algorithm 2 with the ones resulting from the CV-CA models. It presents the means as well as the standard deviations of the position prediction errors at the end of the prediction horizon. It can be seen that for short prediction horizons, the two model sets show comparable performance. For longer predictions, however, the VT-DK model set produces smaller prediction errors (between 34.0% and 53.4% for 4 s) and reduced uncertainty about its predictions (between 59.7% and 68.6% for 4 s). This can be attributed to the intention-based nature of non-colliding predictions, along with the stable VT and DK models that limit the growth of the uncertainty.

C. Real-Time Computation Capabilities

Figure 4:
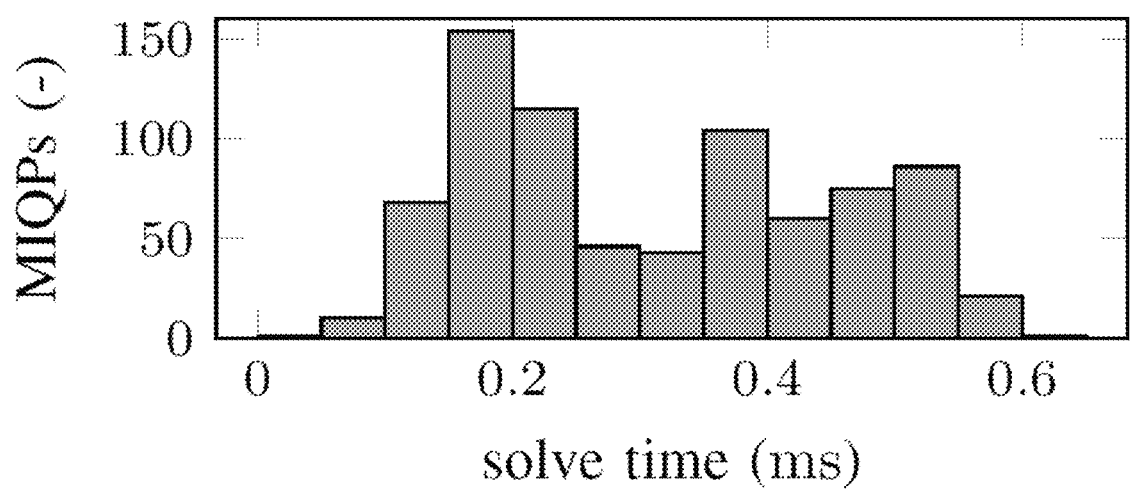
FIG. 4 is a histogram of exemplary projection MIQP solve times of Eq. (18) using FORCES PRO for a prediction horizon of 4 s. See text.

Next, the inventors have evaluated the real-time capability of the proposed algorithm. The only computationally demanding step of our method is solving the projection optimization problems of (18). They have evaluated the computational burden by solving 784 MIQPs from the NGSIM test cases using FORCES PRO [22], for a prediction horizon of 4 s (T=40). The resulting solve times are displayed in FIG. 4. FORCES PRO needs approximately 0.2 ms to 0.5 ms for most of the solves. Assuming a conservative average solve time of 0.5 ms per MIQP, the projection of all M=6 models of M takes 3 ms per IMM-KF recursion. For a local cluster of N=10 vehicles, evaluating each of them sequentially with Algorithm 2 takes 30 ms. This is well within the available time margin (e.g., for a 0.1 s sampling time), thus making the method executable in real time. This can be further improved by parallelizing the M MIQPs of the IMM-KF. The computations were carried out on an Intel i7 CPU at 3.60 GHz with 32 GB memory.

2.1.6 Concluding Remarks

This section describes a full framework for motion estimation and prediction of traffic participants in highway driving scenarios. First, it focused on estimation of a single vehicle and designed an IMM-KF-based algorithm using a novel, intention-based model set, consisting of typical driving manoeuvres exhibited by traffic participants during highway driving. Further, the algorithm was extended to generate non-colliding predictions using projections onto a feasible collision-free space. Lastly, motion estimation and prediction for multiple vehicles is addressed by assuming a hierarchical structure, which is encoded through a vehicle priority list. Simulation results with the NGSIM dataset showed increased motion prediction accuracy compared to a benchmark algorithm in the literature and demonstrated the proposed algorithm's real-time capabilities.

2.2 Computerized Systems and Computer Program Products

Computerized devices can be suitably designed for implementing embodiments of the present invention as described herein. In that respect, it can be appreciated that the methods described herein are at least partly non-interactive, i.e., automated. Automated parts of such methods can be implemented in software, hardware, or a combination thereof. In exemplary embodiments, automated parts of the methods described herein are implemented in software, as a service or an executable program (e.g., an application), the latter executed by suitable digital processing devices.

For instance, as depicted in FIG. 6, a typical computerized device (or unit) 200 may include a processor 230 and a memory 250 (possibly including several memory units) coupled to one or memory controllers 240. The processor 230 is a hardware device for executing software, as e.g., loaded in a main memory of the device. The processor, which may in fact comprise one or more processing units, can be any custom made or commercially available processor. The system 202 shown in FIG. 5 is similar to the system 200 in many respects.

The memory typically includes a combination of volatile memory elements (e.g., random access memory) and non-volatile memory elements, e.g., a solid-state device. The software in memory may include one or more separate programs, each of which comprises an ordered listing of executable instructions for implementing logical functions. In the example of FIG. 6, the software in the memory includes methods described herein in accordance with exemplary embodiments and a suitable operating system (OS). The OS essentially controls the execution of other computer (application) programs and provides scheduling, input-output control, file and data management, memory management, and communication control and related services. It may further control the distribution of tasks to be performed by the processing units 230.

The methods described herein shall typically be in the form of executable program, script, or, more generally, any form of executable instructions.

The computerized unit 200 can further include a display controller 282 coupled to a display 284. In exemplary embodiments, the computerized unit 200 further includes a network interface 290 or transceiver for coupling to a network (not shown). In addition, the computerized unit 200 will typically include one or more input and/or output (I/O) devices 210, 220 (or peripherals) that are communicatively coupled via a local input/output controller 260. A system bus 270 interfaces all components. Further, the local interface may include address, control, and/or data connections to enable appropriate communications among the aforementioned components. The I/O controller 135 may have additional elements, which are omitted for simplicity, such as controllers, buffers (caches), drivers, repeaters, and receivers, to allow data communication.

When the computerized unit 200 is in operation, one or more processing units 230 executes software stored within the memory of the computerized unit 200, to communicate data to and from the memory 250 and/or the storage unit 255 (e.g., a hard drive and/or a solid-state memory), and to generally control operations pursuant to software instruction. The methods described herein and the OS, in whole or in part are read by the processing elements, typically buffered therein, and then executed. When the methods described herein are implemented in software, the methods can be stored on any computer readable medium for use by or in connection with any computer related system or method.

Computer readable program instructions described herein can for instance be downloaded to processing elements from a computer readable storage medium, via a network, for example, the Internet and/or a wireless network. A network adapter card or network interface 290 may receive computer readable program instructions from the network and forwards such instructions for storage in a computer readable storage medium 255 interfaced with the processing means 230.

Aspects of the present invention are described herein notably with reference to a flowchart and a block diagram. It will be understood that each block, or combinations of blocks, of the flowchart and the block diagram can be implemented by computer readable program instructions.

These computer readable program instructions may be provided to one or more processing elements 230 as described above, to produce a machine, such that the instructions, which execute via the one or more processing elements create means for implementing the functions or acts specified in the block or blocks of the flowchart and the block diagram. These computer readable program instructions may also be stored in a computer readable storage medium.

The flowchart and the block diagram in the accompanying drawings illustrate the architecture, functionality, and operation of possible implementations of the computerized unit 200, methods of operating it, and computer program products according to various embodiments of the present invention. Note that each computer-implemented block in the flowchart or the block diagram may represent a module, or a portion of instructions, which comprises executable instructions for implementing the functions or acts specified therein. In variants, the functions or acts mentioned in the blocks may occur out of the order specified in the figures. For example, two blocks shown in succession may actually be executed in parallel, concurrently or still in a reverse order, depending on the functions involved and the algorithm optimization retained. It is also reminded that each block and combinations thereof can be adequately distributed among special purpose hardware components.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated. For example, other scenarios can be contemplated, which may involve other rules.

What is claimed is:

1. A computer-implemented method of planning motion of a vehicle, the method comprising:
   receiving real-time signals as to positions of N traffic participants;
   at each time step of multiple time steps, computing states of each of the N traffic participants according to the signals received, using an interaction-aware model of the N traffic participants, wherein said states include current states, which are estimated for each of the N traffic participants, and future states of each of the participants, which are predicted over a prediction horizon T, and wherein the model is designed to cause the method to:
     recursively compute, at said each time step, the states of each of the N traffic participants according to a hierarchical list, wherein the N traffic participants are ordered from a most determinative one to a least determinative one of the N traffic participants, so as for the states of the η-th participant in the list to be computed based on the states of each of the η−1 participants in the list, ∀η∈[2, . . . , N]; and
     update and sort the hierarchical list based on rules of the road, wherein the rules are evaluated based on the states of each of the N traffic participants as computed at said each time step; and
   at each time step of the multiple time steps,
     based on the states computed for each of the N traffic participants according to the signals received and using the interaction-aware model of the N traffic participants, planning motion of the vehicle for a simulation when the N traffic participants are simulated traffic participants, or
     based on the states computed for each of the N traffic participants according to the signals received and using the interaction-aware model of the N traffic participants, planning motion of the vehicle and instructing actuation of the vehicle in real-world based on the planned motion when the N traffic participants are real-world traffic participants.

2. The method according to claim 1, wherein
the sorting algorithm is designed to enforce each of the following rules upon sorting the hierarchical list:
   for any two participants of the N traffic participants that are on a same lane, a leading one of the two participants is the most determinative of the two participants and thus has a lower rank in the list; and
   for any two participants of the N traffic participants that are on different lanes, the participant of said two participants that has a largest potential longitudinal progress over the prediction horizon T is the most determinative of the two and thus has a lower rank in the list.

3. The method according to claim 1, wherein
each participant of said N traffic participants is associated with a finite set of manoeuvre models, and
the model is further designed to cause the method to compute the states of each of the N traffic participants by:
   estimating probabilities of said respective manoeuvre models to be, each, currently in effect for said each participant; and
   identifying among said respective manoeuvre models a most probable model based on the estimated probabilities, whereby states of said each participant are computed according to the most probable model identified.

4. The method according to claim 3, wherein
the states of each of the N traffic participants are computed using an interacting multiple model Kalman filter, whereby, for said each participant, separate filters of the Kalman filter are used for respective manoeuvre models associated with said each participant and estimates of the separate filters are obtained to estimate the probabilities of the respective manoeuvre models to be currently in effect.

5. The method according to claim 4, wherein
the estimates of the separate filters are obtained in parallel for all of the respective manoeuvre models.

6. The method according to claim 4, wherein
the states of the η-th participant are predicted according to a projection algorithm that enforces an intent of the η-th participant not to collide with any other ones of said η−1 participants in the list, by correspondingly altering states predicted for the η-th participant at every time step, ∀η∈[2, . . . , N].

7. The method according to claim 6, wherein
said projection algorithm is executed according to a mixed-integer quadratic programming implementation thereof.

8. The method according to claim 4, wherein
said finite set of manoeuvre models are based on two longitudinal motion models, respectively corresponding to a velocity tracking model and a distance keeping model.

9. The method according to claim 8, wherein
said finite set of manoeuvre models are based on three lateral motion models, respectively corresponding to intentions of said each participant to:
   stay on a same lane;
   change from a current lane to a left lane; and
   change from the current lane to a right lane.

10. The method according to claim 9, wherein
said finite set of manoeuvre models include six joint motion models combining each of the three lateral motion models with each of the two longitudinal motion models.

11. The method according to claim 10, wherein
said finite set of manoeuvre models consists of said six joint motion models.

12. The method according to claim 1, comprising:
actuating the vehicle in the real-world according to the instructed actuation when the N traffic participants are real-world traffic participants.

13. The method according to claim 1, wherein
the hierarchical list is updated at said each time step.

14. The method according to claim 1, wherein
said prediction horizon T is, on average, between 1 s and 8.0 s.

15. The method according to claim 1, wherein
an average duration of said each time step is between 7.5 ms and 60 ms.

16. A computerized system for planning motion of a vehicle, the system comprising:
processing means;
a memory; and
storage means storing computerized methods,
wherein:
the system is configured to load the computerized methods in the memory, so as to cause the system to access real-time signals as to positions of N traffic participants, and the processing means, at each time step of multiple time steps, to compute states of each of the N traffic participants according to the signals accessed, in operation, using an interaction-aware model of the N traffic participants, wherein said states include current states, which are estimated for each of the N traffic participants, and future states of each of the participants, which are predicted over a prediction horizon T, and wherein the model is designed so as to cause the processing means to:
recursively compute, at said each time step, the states of each of the N traffic participants according to a hierarchical list, wherein the N traffic participants are ordered from a most determinative one to a least determinative one of the N traffic participants, so as for the states of the $\eta$-th participant in the list to be computed based on the states of each of the $\eta-1$ participants in the list, $\forall \eta \in [2, \ldots, N]$; and
update and sort the hierarchical list based on rules of the road, wherein the rules are evaluated based on the states of each of the N traffic participants as computed at said each time step;
wherein the processing means, at each time step of the multiple time steps,
based on the states computed for each of the N traffic participants according to the signals received and using the interaction-aware model of the N traffic participants, plans motion of the vehicle for a simulation when the N traffic participants are simulated traffic participants, or
based on the states computed for each of the N traffic participants according to the signals received and using the interaction-aware model of the N traffic participants, plans motion of the vehicle and instructs actuation of the vehicle in real-world based on the planned motion when the N traffic participants are real-world traffic participants.

17. A vehicle, comprising:
one or more sensors, each configured to detect events or changes in an environment of the vehicle and accordingly produce sensor signals;
a receiving unit connected to the one or more sensors and configured to receive said sensor signals from the sensors, in operation; and
a computerized system comprising:
a processor;
a memory; and
storage to store machine readable instructions executable by the processor to cause the computerized system to:
determine real-time signals as to positions of N traffic participants based on the received sensor signals; and
at each time step of multiple time steps, plan motion of the vehicle by computing states of each of the N traffic participants according to the determined real-time signals and using an interaction-aware model of the N traffic participants, wherein said states include current states, which are estimated for each of the N traffic participants, and future states of each of the participants, which are predicted over a prediction horizon T, and wherein the model causes the processor means to:
recursively compute, at said each time step, the states of each of the N traffic participants according to a hierarchical list, wherein the N traffic participants are ordered from a most determinative one to a least determinative one of the N traffic participants, so as for the states of the $\eta$-th participant in the list to be computed based on the states of each of the $\eta-1$ participants in the list, $\forall \eta \in [2, \ldots, N]$; and
update and sort the hierarchical list based on rules of the road,
wherein the rules are evaluated based on the states of each of the N traffic participants as computed at said each time step; and
wherein the computerized system is to instruct to actuate the vehicle in a partly or fully autonomous or automated manner, according to the planned motion.

18. A computer program product for planning motion of a vehicle, the computer program product comprising a non-transitory computer readable storage medium having program instructions embodied therewith, the program instructions executable by a plurality of processing means to cause the processing means to:
access real-time signals as to positions of N traffic participants;
at each time step of multiple time steps, compute states of each of the N traffic participants according to the signals accessed, using an interaction-aware model of the N traffic participants, wherein said states include current states, which are estimated for each of the N traffic participants, and future states of each of the participants, which are predicted over a prediction horizon T, and the model is designed so as to cause the processing means to:
recursively compute, at said each time step, the states of each of the N traffic participants according to a hierarchical list, wherein the N traffic participants are ordered from a most determinative one to a least determinative one of the N traffic participants, so as for the states of the $\eta$-th participant in the list to be computed based on the states of each of the $\eta-1$ participants in the list, $\forall \eta \in [2, \ldots, N]$; and update and sort the hierarchical list based on rules of the road, wherein the rules are evaluated based on the states of each of the N traffic participants as computed at said each time step; and at each time step of the multiple time steps,
based on the states computed for each of the N traffic participants according to the signals received and using the interaction-aware model of the N traffic participants, plan motion of the vehicle for a simulation when the N traffic participants are simulated traffic participants, or based on the states computed for each of the N traffic participants according to the signals received and using the interaction-aware model of the N traffic participants, plan motion of the vehicle and instruct actuation of the vehicle in real-world based on the planned motion when the N traffic participants are real-world traffic participants.

\* \* \* \* \*